US008417665B2

(12) United States Patent
Chen et al.

(10) Patent No.: US 8,417,665 B2
(45) Date of Patent: *Apr. 9, 2013

(54) INFORMATION EXTRACTION METHOD, EXTRACTOR REBUILDING METHOD, AND SYSTEM AND COMPUTER PROGRAM PRODUCT THEREOF

(75) Inventors: Yen-Yu Chen, Taichung (TW); Ping-Hai Hsu, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 559 days.

This patent is subject to a terminal disclaimer.

(21) Appl. No.: 12/640,015

(22) Filed: Dec. 17, 2009

(65) Prior Publication Data

US 2010/0153344 A1 Jun. 17, 2010

Related U.S. Application Data

(63) Continuation-in-part of application No. 12/394,057, filed on Feb. 27, 2009, now Pat. No. 7,925,618.

(30) Foreign Application Priority Data

Dec. 15, 2008 (TW) .............................. 97148837 A
Nov. 11, 2009 (TW) .............................. 98138278 A

(51) Int. Cl.
G06F 17/30 (2006.01)
(52) U.S. Cl. ....................................... 707/602; 707/803
(58) Field of Classification Search ................... 707/602, 707/803, 999.103
See application file for complete search history.

(56) References Cited

U.S. PATENT DOCUMENTS

| 6,714,941 | B1* | 3/2004 | Lerman et al. ......................... 1/1 |
| 7,139,777 | B2* | 11/2006 | Chidlovskii .................. 707/691 |
| 7,289,857 | B2* | 10/2007 | Nauck et al. .................... 700/30 |
| 2005/0125394 | A1* | 6/2005 | Kodama et al. ................... 707/3 |
| 2005/0154701 | A1* | 7/2005 | Parunak et al. ................... 707/1 |
| 2008/0155147 | A1* | 6/2008 | Howard ........................ 710/105 |

FOREIGN PATENT DOCUMENTS

TW 200835331 8/2008

OTHER PUBLICATIONS

"Office Action of Taiwan Counterpart Application", issued on Jan. 17, 2013, p1-p4, in which the listed reference was cited.

* cited by examiner

Primary Examiner — Robert Beausoliel, Jr.
Assistant Examiner — Noosha Arjomandi
(74) Attorney, Agent, or Firm — Jianq Chyun IP Office

(57) ABSTRACT

An information extraction method for extracting dynamic information is provided. The method includes using a plurality of information extractors extracting reference values corresponding to the dynamic information from a plurality of information sources, and determining a most reliable value corresponding to the dynamic information based on the reference values. The method further includes determining whether each of the information extractors is abnormal according to the most reliable value and removing the information extractors determined as abnormal. The method further includes rebuilding new information extractors for replacing the removed information extractors. In such a way, reliable dynamic information can be extracted and the information extractors can be maintained for normal operation.

35 Claims, 13 Drawing Sheets

|  | Time Point T0 | Time Point T1 | Time Point T2 |
|---|---|---|---|
| Information Extractor 102 | 10% | 11% | 11% |
| Information Extractor 104 | 10% | 10% | 11% |
| Information Extractor 106 | 10% | 10% | 10% |
| Information Extractor 108 | 10% | 10% | 10% |
| Information Extractor 110 | 10% | 10% | 10% |
| Most Reliable Value | 10% | 10% | 11% |

FIG. 3

|  | Time Point T0 | Time Point T1 | Time Point T2 |
|---|---|---|---|
| Information Extractor 102 | 10% | 90% | 90% |
| Information Extractor 104 | 10% | 10% | 11% |
| Information Extractor 106 | 10% | 10% | 11% |
| Information Extractor 108 | 10% | 10% | 10% |
| Information Extractor 110 | 10% | 10% | 10% |
| Most Reliable Value | 10% | 10% | 11% |

FIG. 4

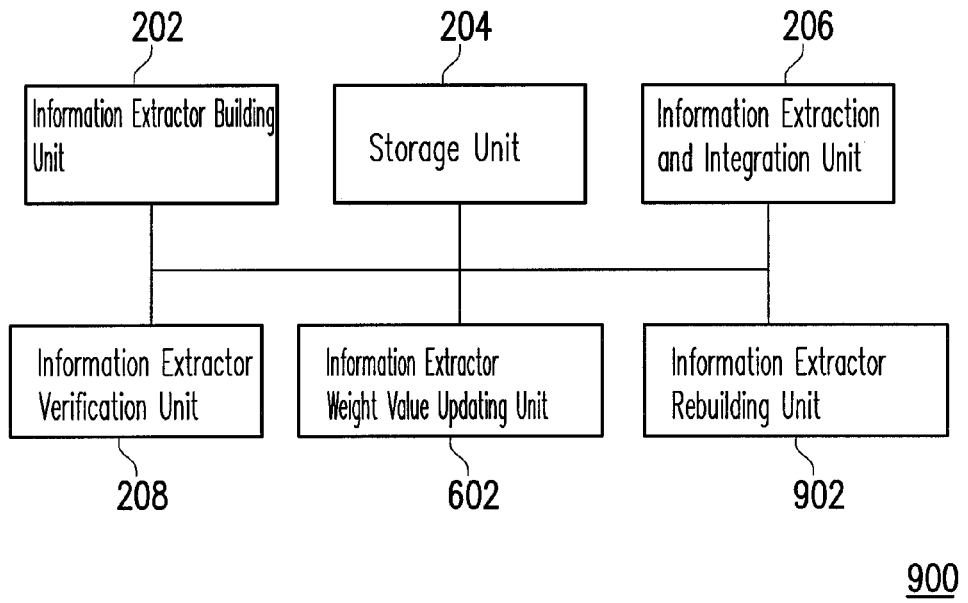

FIG. 9

| | Time Point T0 | Time Point T1 | Time Point T2 | | Time Point T2' | T3 | T4 |
|---|---|---|---|---|---|---|---|
| Information Extractor 102 | 10% | 90% | 90% | Information Extractor 102-1 | 11% | 12% | 13% |
| | | | | Information Extractor 102-2 | 11% | 11% | 11% |
| | | | | Information Extractor 102-3 | 11% | 11% | 11% |
| Information Extractor 104 | 10% | 10% | 11% | Information Extractor 104 | 11% | 12% | 13% |
| Information Extractor 106 | 10% | 10% | 11% | Information Extractor 106 | 11% | 12% | 13% |
| Information Extractor 108 | 10% | 10% | 10% | Information Extractor 108 | 10% | 11% | 12% |
| Information Extractor 110 | 10% | 10% | 10% | Information Extractor 110 | 10% | 11% | 12% |
| Most Reliable Value | 10% | 10% | 11% | Most Reliable Value | 11% | 12% | 13% |

FIG. 10

| | Time Point T0 | Time Point T1 | Time Point T2 | Time Point T3 | Time Point T4 |
|---|---|---|---|---|---|
| Information Extractor 102 | 10%(0) | 90%(0) | 90%(1) | 91%(1) | 91%(2) |
| Information Extractor 104 | 10%(0) | 10%(0) | 11%(0) | 12%(0) | 12%(0) |
| Information Extractor 106 | 10%(0) | 10%(0) | 11%(0) | 11%(0) | 12%(0) |
| Information Extractor 108 | 10%(0) | 10%(0) | 10%(1) | 11%(0) | 11%(1) |
| Information Extractor 110 | 10%(0) | 10%(0) | 10%(1) | 11%(0) | 11%(1) |
| Most Reliable Value | 10% | 10% | 11% | 11% | 12% |

INFORMATION EXTRACTION METHOD, EXTRACTOR REBUILDING METHOD, AND SYSTEM AND COMPUTER PROGRAM PRODUCT THEREOF

CROSS-REFERENCE TO RELATED APPLICATION

This is a continuation-in-part application of patent application Ser. No. 12/394,057 filed on Feb. 27, 2009, which claims the priority benefit of Taiwan patent application serial no. 97148837, filed Dec. 15, 2008 and is now pending. This continuation-in-part application also claims the priority benefit of Taiwan patent application serial no. 98138278, filed Nov. 11, 2009. The entirety of each of the above-mentioned patent applications is hereby incorporated by reference herein and made a part of this specification.

BACKGROUND OF THE INVENTION

1. Field of the Invention

The disclosure generally relates to an information extraction method capable of providing a reliable information and having a self-rebuilding function, and a system and a computer program product thereof.

2. Description of Related Art

Because of the fast development of the Internet, more and more dynamic information (e.g. weather information, stock market information) can be accessed or downloaded from the Internet. The technology of information extractor is developed for extracting specific information from an information source (e.g. a webpage).

The technology of information extractor allows a user conveniently extracting desired dynamic information from the information source. However, in case the format of the information source changes (e.g. the webpage is redesigned), the information extractor usually has to update the extraction rule thereof in accordance with the new format of the information source. Otherwise, the information extractor would become incapable of correctly extracting information from the corresponding information source.

Formats of information sources may be frequently and unexpectedly updated. As such, it is always an arduous and difficult job to manually maintain an information extractor for normal operation. Further, when many different types of dynamic information are desired to be extracted, it would have been a mission impossible to maintain the information extractors (e.g. information extractors for extracting closing indices of a stock market and temperatures of Taipei, respectively) for all of the types of the information. Furthermore, the reliability of dynamic information extracted from the specific information sources is often unguaranteed due to some unexpected factors (e.g. the dynamic information is not timely updated at the connected information source). Therefore, it is an object of those skilled in the art to provide a mechanism capable of self-recovery or rebuilding abnormal information extractor for providing reliable dynamic information.

SUMMARY

Accordingly, the disclosure is directed to provide an information extraction method capable of extracting reliable information from a plurality of information sources, detecting an abnormal information extractor, and rebuilding the abnormal information extractor.

Further, the disclosure is directed to provide an information extraction system capable of extracting reliable information from a plurality of information sources, detecting an abnormal information extractor, and rebuilding the abnormal information extractor.

The disclosure is directed to provide a computer program product including an information extraction program capable of extracting reliable information from a plurality of information sources, detecting an abnormal information extractor, and rebuilding the abnormal information extractor.

The disclosure is further directed to provide an information extractor rebuilding method capable of detecting an abnormal information extractor and rebuilding the abnormal information extractor.

The disclosure is still directed to provide an information extractor rebuilding system capable of detecting an abnormal information extractor and rebuilding the abnormal information extractor.

The disclosure is also directed to provide a computer program product including an information extraction program capable of detecting an abnormal information extractor and rebuilding the abnormal information extractor.

Consistent with exemplary embodiments of the disclosure, an information extraction method, adapted for extracting dynamic information. The information extraction method includes building a plurality of information extractors for connecting with a plurality of information sources providing the dynamic information and setting weight values for the information extractors, respectively. The information extraction method also includes recording a first reference value of the dynamic information extracted by each of the information extractors from each of the corresponding information sources at a first time point, and determining a first reliable value corresponding to the dynamic information according to the first reference values. The information extraction method also includes using each of the information extractors to extract a second reference value of the dynamic information from each of the corresponding information sources at a second time point. And, the information extraction method includes determining a second reliable value corresponding to the dynamic information at the second time point according to the weight values of the information extractors and the extracted second reference values. Additionally, the information extraction method further includes verifying whether each of the information extractors is abnormal, and when any one of the information extractors is verified as an abnormal information extractor, removing the verified abnormal information extractor.

Consistent with yet other exemplary embodiments of the disclosure, an information extraction system for extracting dynamic information includes an information extractor building unit, a storage unit, an information extraction and integration unit, and an information extractor verification unit. The information extractor building unit is configured for building a plurality of information extractors for connecting with a plurality of information sources providing the dynamic information, and setting weight values for the information extractors, respectively. The storage unit is configured for storing a first reference value of the dynamic information extracted by each of the information extractors from each of the corresponding information sources at a first time point, and a first reliable value corresponding to the dynamic information. The information extraction and integration unit is configured for using each of the information extractors to extract a second reference value of the dynamic information from each of the corresponding information sources at a second time point. Additionally, the information extraction and integration unit may determines a second reliable value corresponding to the dynamic information at the second time point according to the weight values of the information extractors and the extracted second reference values. The information extractor verification unit is configured for verifying whether each of the information extractors is abnormal, and when any one of the information extractors is verified as an abnormal information extractor, removing the verified abnormal information extractor.

Consistent with yet other exemplary embodiments of the disclosure, which provides a computer program product having an information extraction program. When the information extraction program is loaded and executed by a computer, the computer is capable of conducting the foregoing information extraction method.

Consistent with yet other exemplary embodiments of the disclosure, an information extractor rebuilding method, adapted for an information extraction system. The information extraction system is configured for extracting dynamic information from a plurality of information sources connected with a plurality of information extractors, and each of the information extractors has a weight value. The information rebuilding method includes using each of the information extractors to extract a second reference value of the dynamic information from each of the corresponding information sources at a second time point. And, the information rebuilding method includes determining a second reliable value corresponding to the dynamic information at the second time point according to the weight values of the information extractors and the extracted second reference values. The information extractor rebuilding method also includes building a substitutive information extractor for each information source having no information extractor connected thereto according to the second reliable value. The information extractor rebuilding method further includes using each of the information extractors and the rebuilt substitutive information extractor(s) extracting a third reference value of the dynamic information from each of the corresponding information sources at a third time point. And, the information extractor rebuilding method also includes determining a third reliable value corresponding to the dynamic information at the third time point according to the weight values of the information extractors and the extracted third reference values. Additionally, the information extractor rebuilding method further includes verifying whether each of the information extractors and the rebuilt substitutive information extractor(s) is abnormal, and when any one of the information extractors and the substitutive information extractor(s) is verified as an abnormal information extractor, removing the verified abnormal information extractor.

Consistent with yet other exemplary embodiments of the disclosure, which further provides an information extractor rebuilding system, adapted for an information extraction system. The information extraction system is configured for extracting dynamic information from a plurality of information sources connected with a plurality of information extractors and each of the information extractors has a weight value. The information extractor rebuilding system includes an information extraction and integration unit, an information extractor rebuilding unit, and an information extractor verification unit. The information extraction and integration unit is configured for using each of the information extractors to extract a second reference value of the dynamic information from each of the corresponding information sources at a second time point. And, the information extraction and integration unit may determine a second reliable value corresponding to the dynamic information at the second time point according to the weight values of the information extractors and the extracted second reference values. The information extractor rebuilding unit is configured for building a substitutive information extractor for each information source having no information extractor connected thereto according to the second reliable value. Additionally, the information extraction and integration unit may use each of the information extractors and the rebuilt substitutive information extractor(s) to extract a third reference value of the dynamic information from each of the corresponding information sources at a third time point. And, the information extraction and integration unit may determine a third reliable value corresponding to the dynamic information at the third time point according to the weight values of the information extractors and the extracted third reference values. The information extractor verification unit is used for verifying whether each of the information extractors and the substitutive information extractor(s) is abnormal, and when any one of the information extractors and the substitutive information extractor(s) is verified as an abnormal information extractor, removing the verified abnormal information extractor.

Consistent with yet other exemplary embodiments of the disclosure, which further provides a computer program product having an information extractor rebuilding program. When the information extractor rebuilding program is loaded to and executed by a computer, the computer is capable of conducting the foregoing information extractor rebuilding method.

Consistent with exemplary embodiments of the disclosure, an information extraction method, adapted for extracting dynamic information. The information extraction method includes building a plurality of information extractors for connecting with a plurality of information sources and setting a weight value and an abnormal counting value for each of the information extractors, wherein each of the information extractors provides the dynamic information. The information extraction method also includes extracting a second reference value of the dynamic information from each of the corresponding information sources at a second time point, and determining a second reliable value corresponding to the dynamic information according to the weight values and the second reference values. The information extraction method also includes respectively determining whether the second reference values are not equal to the second reliable value, and counting the abnormal counting value of the information extractor having the second reference value that is not equal to the second reliable value. And, the information extraction method includes respectively determining the abnormal counting values are smaller than an abnormal counting threshold value, and verifying that the information extractor having the abnormal counting value that is not smaller than the abnormal counting threshold value is an abnormal information extractor. Additionally, the information extraction method further includes removing the verified abnormal information extractor.

Consistent with yet other exemplary embodiments of the disclosure, an information extraction system for extracting dynamic information includes an information extractor building unit, a storage unit, an information extraction and integration unit, and an information extractor verification unit. The information extractor building unit is configured for building a plurality of information extractors for connecting with a plurality of information sources and determining a weight value and an abnormal counting value for each of the information extractors, wherein each of the information extractors provides the dynamic information. The information extraction and integration unit is configured for extracting a second reference value of the dynamic information from each of the corresponding information sources at a second time point, and determining a second reliable value corresponding to the dynamic information according to the weight values and the second reference values. The information extractor verification unit is configured for respectively determining whether the second reference values are not equal to the second reliable value, and counting the abnormal counting value of the information extractor having the second reference value which is not equal to the second reliable value. Additionally, the information extractor verification unit respectively determines the abnormal counting values are smaller than an abnormal counting threshold value, verifies that the information extractor having the abnormal counting value that is not smaller than the abnormal counting threshold value is an abnormal information extractor, and removes the verified abnormal information extractor.

Consistent with yet other exemplary embodiments of the disclosure, which provides a computer program product having an information extraction program. When the information extraction program is loaded and executed by a computer, the computer is capable of conducting the foregoing information extraction method.

As such, in the exemplary embodiments of the disclosure, a plurality of information extractors is employed for extracting dynamic information from a plurality of information sources, and a most reliable value of the corresponding dynamic information is determined according to a weight value and an updating threshold value of each of the information extractors. Therefore, abnormal information extractors can be detected according to the determining result, and information extractors for the information sources previously connected with the abnormal information extractors can be rebuilt. In such a way, the value of the dynamic information is reliably updated according to the disclosure.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

FIG. 3 shows an example for illustrating the determination of a most reliable value according to an exemplary embodiment of the disclosure.

FIG. 4 shows an example for illustrating the determination of an abnormal information extractor according to an exemplary embodiment of the disclosure.

FIG. 9 is a schematic block diagram illustrating an information extraction system according to a third exemplary embodiment of the disclosure.

FIG. 10 is an example for illustrating the information extraction according to the third exemplary embodiment of the disclosure.

DESCRIPTION OF THE EXEMPLARY EMBODIMENTS

Figure 1:
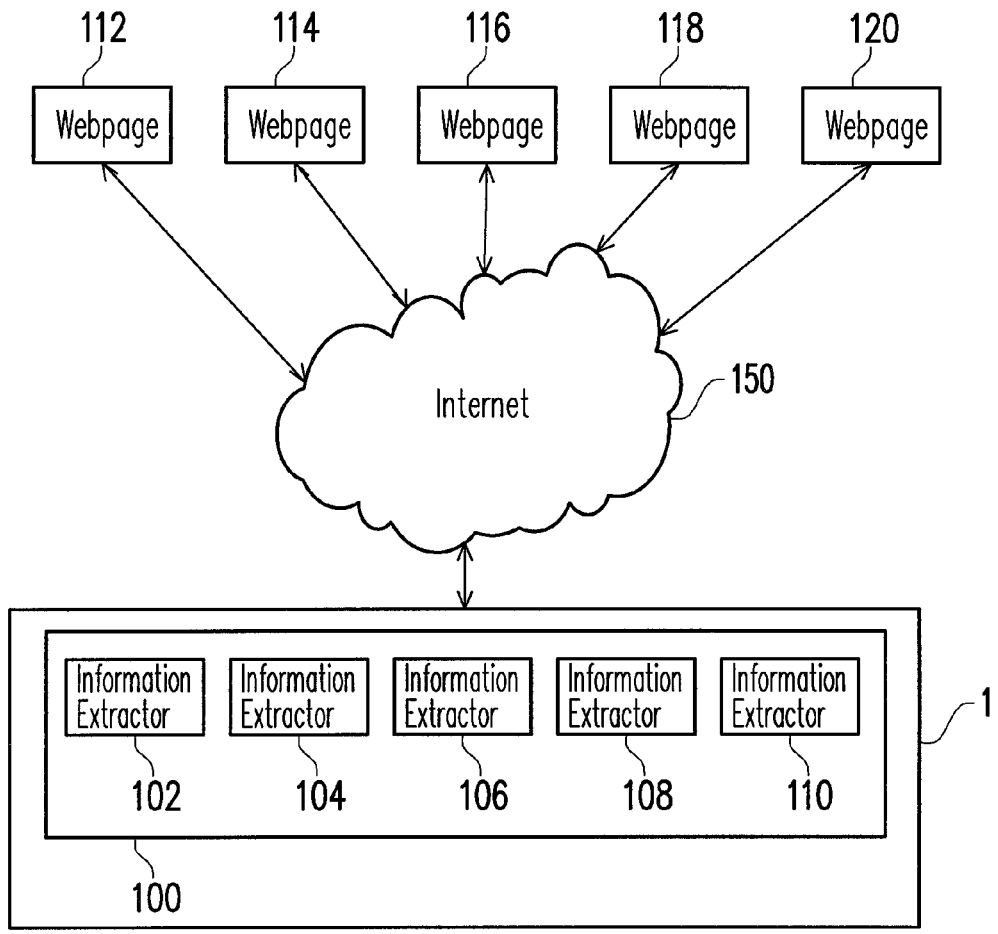
FIG. 1 is a schematic diagram illustrating an information extraction according to a first exemplary embodiment of the disclosure.

Reference will now be made in detail to the present preferred exemplary embodiments of the disclosure, examples of which are illustrated in the accompanying drawings. Wherever possible, the same reference numbers are used in the drawings and the description to refer to the same or like parts.

First Exemplary Embodiment

FIG. 1 is a schematic diagram illustrating an information extraction according to a first exemplary embodiment of the disclosure.

Referring to FIG. 1, in the exemplary embodiment, a user operates a user terminal 1 (e.g. personal computer). The user terminal 1 includes an information extraction system 100. The information extraction system 100 is used to extract dynamic information of the raining probability of Taipei city. The information extraction system 100 builds information extractors 102, 104, 106, 108, and 110, thus extracting the information of the raining probability of Taipei city from webpages 112, 114, 116, 118, and 120 via the Internet 150. Specifically, all of the webpages 112, 114, 116, 118, and 120 provide the dynamic information about the raining probability of Taipei city. The information extraction system 100 builds an information extractor corresponding to each of the webpages, and each of the information extractors is connected to the corresponding webpage for extracting the dynamic information about the raining probability of Taipei city therefrom. For example, the information extractors 102, 104, 106, 108, and 110 extract the dynamic information about the raining probability of Taipei city, from the webpages 112, 114, 116, 118, and 120, respectively.

It should be noted that the information extractors 102, 104, 106, 108, and 110 indicate and analyse the webpages 112, 114, 116, 118, and 120 connected thereto with a document object model (DOM) tree, and thus extracting the information about the raining probability of Taipei city. However, the disclosure is not restricted as such. In another exemplary embodiment of the disclosure, the information extractors 102, 104, 106, 108, and 110 can also indicate and analyse the webpages 112, 114, 116, 118, and 120 connected thereto with a finite state machine or a regular expression. Further, it should be understood that the disclosure is illustrated with but not restricted by the example of extracting the information of the raining probability of Taipei city. In other cases, the information extraction system 100 can also be applied of extract other kinds of dynamic information as desired from different information sources.

Figure 2:
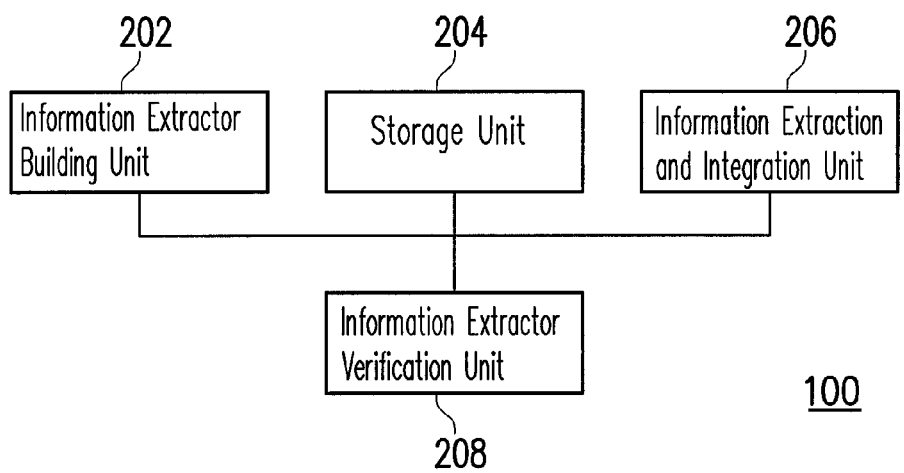
FIG. 2 is a schematic block diagram illustrating an information extraction system according to the first exemplary embodiment of the disclosure.

FIG. 2 is a schematic block diagram illustrating an information extraction system according to the first exemplary embodiment of the disclosure.

Referring to FIG. 2, the information extraction system 100 includes an information extractor building unit 202, a storage unit 204, an information extraction and integration unit 206, and an information extractor verification unit 208.

The information extractor building unit 202 is configured for building information extractors for connecting with information sources. In other words, the information extractor building unit 202 is capable of building information extractors corresponding to the webpages desired to be connected by the user. As shown in FIG. 1, the information extractor building unit 202 builds the information extractors 102, 104, 106, 108, and 110 corresponding to the webpages 112, 114, 116, 118, and 120, respectively.

The storage unit 204 is configured for storing information extracted by the information extractors 102, 104, 106, 108, and 110 from the webpages 112, 114, 116, 118, and 120. In the present exemplary embodiment, the storage unit 204 is a hard disk. However, in another exemplary embodiment of the disclosure, the storage unit 204 can also be a non-volatile memory, an optical storage medium, or other suitable storage media.

The information extraction and integration unit 206 is configured for requesting the information extractors to extract information from corresponding information sources. For example, the information extraction and integration unit 206 instructs the information extractors 102, 104, 106, 108, and 110 to extract the information of the raining probability of Taipei city from the webpages 112, 114, 116, 118, and 120. Specifically, the information extraction and integration unit 206 determines a most reliable value of the dynamic information to be extracted according to the information extracted by the extractors. Specifically, as discussed above, the webpages (i.e. the information sources) sometimes may fail to provide timely updated correct information due to their inherent update frequency. Therefore, the information extraction method of the exemplary embodiment extracts the same dynamic information from a plurality of information sources, and determines a most reliable value of the dynamic information at a present time point according to the information provided by the plurality of information sources. For example, at a specific time point, the information extraction and integration unit 106 requests the information extractors 102, 104, 106, 108 and 110 to extract reference values of the raining probability of Taipei city from the webpages 112, 114, 116, 118, and 120, and determines a most reliable value of the raining probability of Taipei city according to the reference values extracted by the information extractors 102, 104, 106, 108 and 110.

Specifically, in the exemplary embodiment of the disclosure, the information extractor building unit 202 is configured for determining a weight value for each of the information extractors. The information extraction and integration unit 206 calculates an update weighted value according to the reference values extracted by the information extractors at a specific time point and the weight values thereof, and determines whether the update weighted value exceeds an update threshold value, thus determining the most reliable value of the dynamic information to be extracted at the specific time point.

In the exemplary embodiment of the disclosure, the weight values represent the weights of the information extractors relative to the integrated information. For example, in the exemplary embodiment, the weight values are designed to be values ranging from 0 to 1. In the exemplary embodiment, the weight value of each of the information extractors is set by the user when the information extractor is built. The weight values of different information extractors can be identical or different. The update threshold value is used for determining the time point for updating the most reliable value. The update threshold value can be set by the user according to the design of the weight values. When a higher threshold value is set, the most reliable value will be updated only when more information sources have updated the dynamic information (e.g. the raining probability of Taipei). In the exemplary embodiment, the threshold value is set as 1.5.

FIG. 3 shows an example for illustrating the determination of a most reliable value according to an exemplary embodiment of the disclosure. For example, it is assumed that at a time point T0, all reference values of the raining probability of Taipei city extracted by the information extractors 102, 104, 106, 108, and 110 from the webpages 112, 114, 116, 118, and 120 are 10%, and the most reliable of the raining probability of Taipei city at the time point T0 is 10%. In this case, if all of the weight values of the information extractors 102, 104, 106, 108 and 110 at a time point T1 are 1, and the reference values of the raining probability of Taipei city extracted from the webpages 112, 114, 116, 118, and 120 are 11%, 10%, 10%, 10%, and 10%, respectively, the information extraction and integration unit 206 calculates that the update weighted value for the raining probability of Taipei city being 11% is 1 because only the reference value extracted by the information extractor 102 has been updated to be 11%. And, because the update weighted value is smaller than the update threshold value, the information extraction and integration unit 206 determines that the most reliable value of the raining probability of Taipei city at the time point T1 is 10%.

If the reference values of the raining probability of Taipei city extracted by the information extractors 102, 104, 106, 108, and 110 from the webpages 112, 114, 116, 118, and 120 at a time point T2 are 11%, 11%, 10%, 10%, and 10%, respectively, the information extraction and integration unit 206 calculates that the update weighted value for the raining probability of Taipei city being 11% is 2 because the reference values extracted by the information extractors 102 and 104 have been updated to be 11%. And, because the update weighted value is greater than the update threshold value, the information extraction and integration unit 206 determines that the most reliable value of the raining probability of Taipei city at the time point T2 is 11%.

Referring to FIG. 2 again, the information extractor verification unit 208 is used for verifying whether each of the information extractors is abnormal or not according to the reference values extracted by the information extractors. When any one of the information extractors is verified as an abnormal information extractor, the information extractor verification unit 208 removes the verified abnormal information extractor.

Specifically, as discussed above, each information source may be unexpectedly performed with a redesign of its files (e.g. webpage), so that the previously built information extractor corresponding to the information source may fail to extract the specific dynamic information with the previously used extraction rule, and is categorized as being in an abnormal status. In this case, the information extractor verification unit 208 determines whether each of the information extractors is in an abnormal status according to the extraction procedure of the extractor. For example, when a reference value extracted by an information extractor at a present time point or a previous time point is distinct from a most reliable value of the present time point or the previous time point, the information extractor is believed to be in an abnormal status.

FIG. 4 shows an example for illustrating the determination of an abnormal information extractor according to an exemplary embodiment of the disclosure.

Referring to FIG. 4, for example, it is assumed that all reference values of the raining probability of Taipei city extracted by the information extractors 102, 104, 106, 108, and 110 from the webpages 112, 114, 116, 118, and 120 at a time point T0 are 10%, and the maximum reliable of the raining probability of Taipei city at the time point T0 is 10%. In this case, if at the time point T1, at the time point T1, all of the weight values of the information extractors 102, 104, 106, 108 and 110 are 1, while the update threshold value is set as 1.5, and the reference values of the raining probability of Taipei city extracted by the information extractors 102, 104, 106, 108, and 110 from the webpages 112, 114, 116, 118, and 120 are 90%, 10%, 10%, 10%, and 10%, respectively, the information extraction and integration unit 206 determines that the most reliable value of the raining probability of Taipei city at the time point T1 is 10%.

If at the time point T2, the reference values of the raining probability of Taipei city extracted by the information extractors 102, 104, 106, 108, and 110 from the webpages 112, 114, 116, 118, and 120 are 90%, 11%, 11%, 10%, and 10%, respectively, the information extraction and integration unit 206 determines that the most reliable value of the raining probability of Taipei city at the time point T2 is 11%. In this time, because the reference value "90%" extracted by the information extractor 102 at the time point T1 is distinct from the most reliable value "10%" at the time point T1, and is further distinct from the most reliable value "11%" at the time point T2, and further the reference value "90%" extracted by the information extractor 102 at the time point T2 is distinct from the most reliable value "10%" at the time point T1, and is further distinct from the most reliable value "11%" at the time point T2, the information extraction and integration unit 206 determines that the information extractor 102 is in an abnormal status and removes the information extractor 102. Steps of information extraction according to the exemplary embodiment of the disclosure are to be illustrated in more details while referring to the drawings associated thereto.

In another exemplary embodiment of the disclosure, the information extraction system 100 further includes an output unit (not shown) for outputting the determined corresponding most reliable values of the raining probability of Taipei city.

Figure 5A:
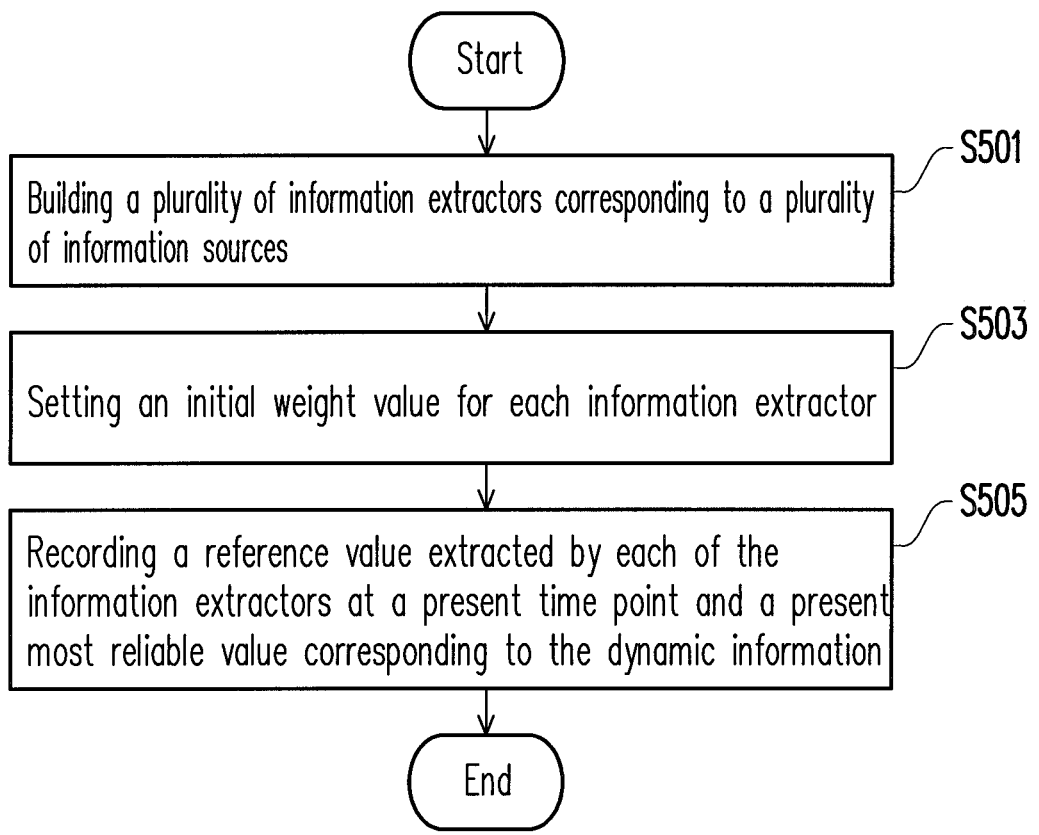
FIGS. 5A and 5B illustrate a flow chart of the information extraction method according to the first exemplary embodiment of the disclosure.
Figure 5B:
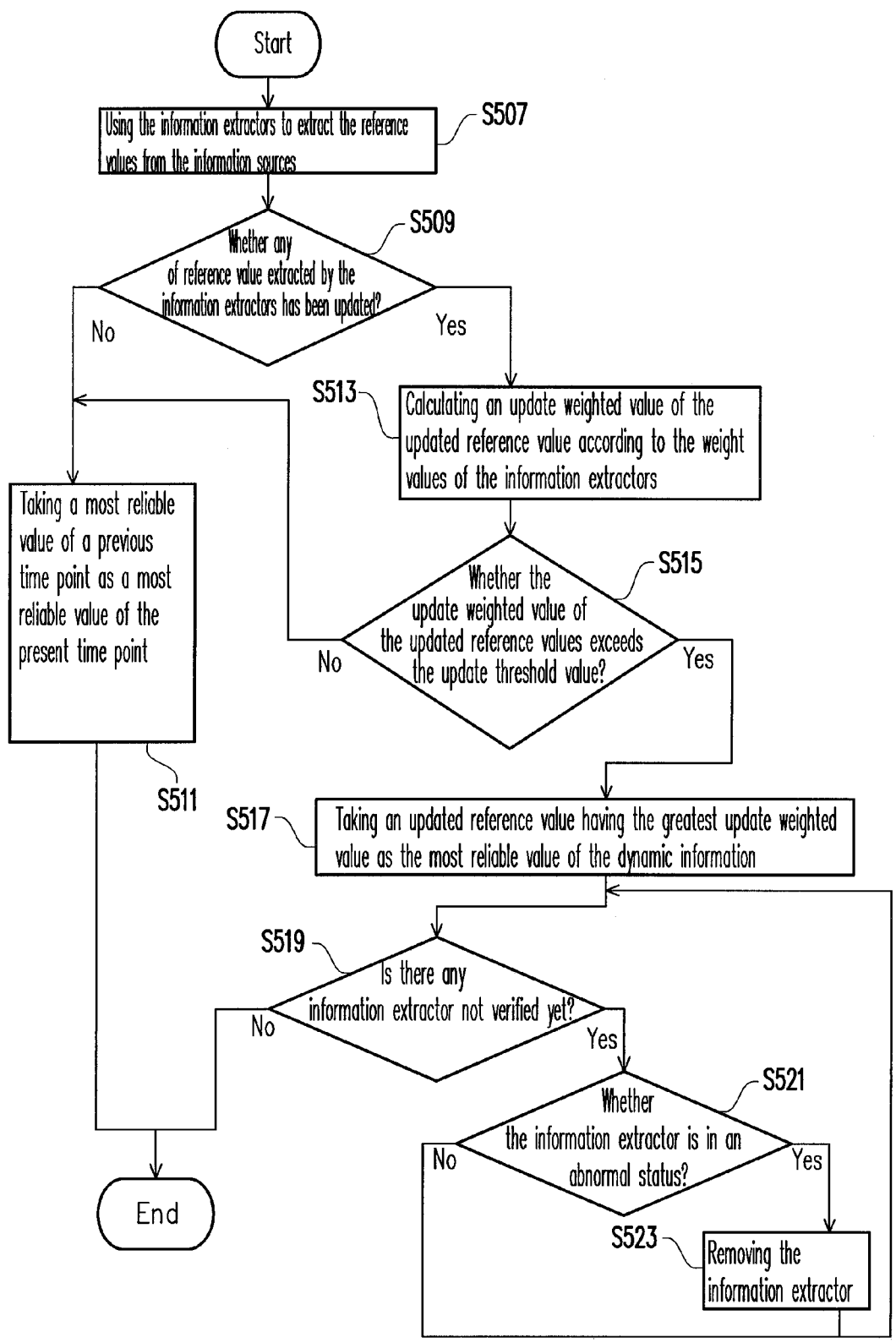

FIGS. 5A and 5B illustrate a flow chart of the information extraction method according to the first exemplary embodiment of the disclosure. FIG. 5A illustrates the steps of building the information extractors, while FIG. 5B illustrates the steps of executing the information extraction.

Referring to FIG. 5A, at step S501, a plurality of information extractors (e.g. the information extractors 102, 104, 106, 108, and 110) are built corresponding to a plurality of information sources (e.g. the webpages 112, 114, 116, 118, and 120). The information extractors are used for extracting the dynamic information (e.g. the raining probability of Taipei city) from the information sources, respectively. Then, at step S503, weight values are set for the information extractors, respectively. Then, at step S505, a reference value extracted by each of the information extractors at a present time point and a present most reliable value corresponding to the dynamic information are recorded. Hereby, after performing the steps S501 through S505, the initialization of the information extractors is completed.

Then, referring to FIG. 5B, at step S507, reference values are extracted by the information extractors from the information sources.

Then, at step S509, it is determined whether there is a reference value extracted by any information extractor has been updated. If it is determined that none of the reference values extracted by the information extractor has been updated, then at step S511, a most reliable value of a previous time point is taken serving as a most reliable value of a present time point. If otherwise, at step S509, it is determined that whether there is any reference value extracted by an information extractor having been updated, then at step S513, an update weighted value of the updated reference value is calculated according to the weight values of the information extractors. Specifically, at step S513, only the update weighted value of the updated reference value at the present point is calculated, while the reference values of those non-updated reference values are not counted in the calculation.

Then, at step S515, it is determined whether the update weighted value of the updated reference values exceeds the update threshold value. If it is determined that the update weighted value of the updated reference values does not exceed the update threshold value, step S511 is executed.

If it is determined that the update weighted value of the updated reference values exceeds the update threshold value, then at step S517, an updated reference value having the greatest update weighted value is taken serving as the most reliable value of the dynamic information. When the most reliable value corresponding to the dynamic information has been updated, in the information extraction method of the exemplary embodiment, each of the information extractors is verified.

At step S519, it is determined whether there is any information extractor not verified yet. If all of the information extractors have been verified, then the flow shown in FIG. 5B is ended. If it is determined that there is an information extractor not verified, then at step S521, it is determined whether the information extractor is in an abnormal status (For example, the determination shown in FIG. 4), according to the reference values presently and previously extracted by the information extractor, respectively, and the most reliable values presently and previously extracted by the information extractor. If at step S521 it is determined that the information extractor is in an abnormal status (i.e. the information extractor is an abnormal information extractor), then at step S523, the information extractor which is determined as in the abnormal status is removed, and the flow returns back to step S519.

In the exemplary embodiment, a plurality of information extractors are built for extracting the desired dynamic information from a plurality of information sources, so as to assure the reliability of the extracted information. Further, the most reliable value corresponding to the dynamic information is determined in accordance with the provided update threshold value. In such a way, the dynamic information can be relatively fast updated while the reliability of the information is considered.

Second Exemplary Embodiment

In the first exemplary embodiment of the disclosure, after the weight value of each information extractor is initialized, it remains unchanged during the subsequent information extraction operation. However, in other exemplary embodiments, the weight value of each information extractor can also be dynamically updated in accordance with the output of extraction at each time point. In such a way, the most reliable value of the dynamic information can be more accurately and more rapidly updated.

Figure 6:
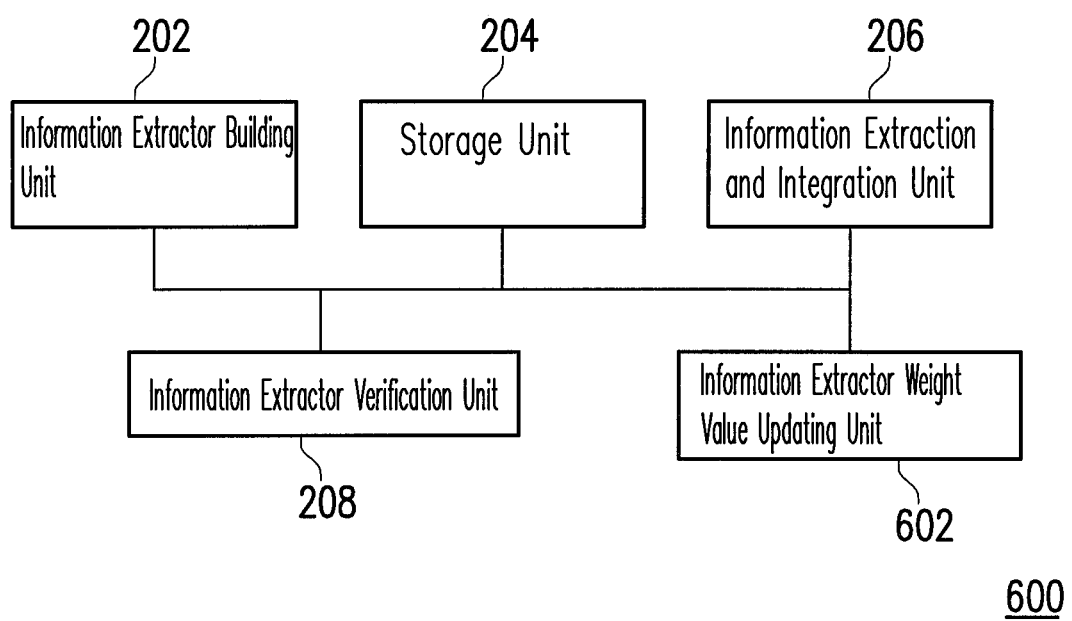
FIG. 6 is a schematic block diagram illustrating an information extraction system according to a second exemplary embodiment of the disclosure.

FIG. 6 is a schematic block diagram illustrating an information extraction system 600 according to a second exemplary embodiment of the disclosure.

Referring to FIG. 6, comparing with the information extraction system 100, the information extraction system 600 further includes an information extractor weight value updating unit 602. The rest parts of the information extraction system 600 except the information extractor weight value updating unit 602 are structurally and functionally same with that of the information extraction system 100, and are not to be iterated hereby.

The information extractor weight value updating unit 602 is configured for dynamically updating a weight value of each of the information extractors. For example, in the exemplary embodiment, the weight value of each of the information extractors is calculated according to reliability and timeliness of the information extractor.

The reliability of the information extractor represents how much the user relies upon the reference value extracted by the information extractor. In the exemplary embodiment of the disclosure, the reliability is designed as a value ranging from 0 to 1. For example, when the user uses the information extractor building unit 202 to initially build an information extractor corresponding to a specific information source, the reliability of the information extractor can be set as 1. At each time point that the most reliable value is updated, when the reference value extracted by the information extractor is identical with the most reliable value determined by the information extraction and integration unit 206, the information extractor weight value updating unit 602 updates the reliability of the information extractor according to equation (1) as following:

$$R_{n,t}=R_{n,t-1}\times\alpha+1.0\times(1-\alpha) \quad (1),$$

wherein $R_{n,t}$ represents reliability of the $n^{th}$ information extractor at a time point t, $R_{n,t-1}$ represents reliability of the $n^{th}$ information extractor at a time point (t−1), and $\alpha$ represents a reliability adjusting factor. In the exemplary embodiment, the value of $\alpha$ affects the range of the reliability adjustment. A lower $\alpha$ value indicates a larger range that the reliability increases, while a higher $\alpha$ value indicates a smaller range that the reliability increases. For example, because the value of the raining probability usually has fewer digits, there is a higher probability that values extracted by the information extractors are same but not the specific dynamic information desired to be extracted. As such, when the information extractors are used for extracting the dynamic information of the raining probability of Taipei city, the $\alpha$ factor is usually set with a greater value for avoiding a fast increase of the reliability. For example, in the exemplary embodiment of the disclosure, the value of $\alpha$ is set as 0.75. However, in another exemplary embodiment of the disclosure, when the information extractors are sued for extracting a stock market index having larger digits, there is a relatively low probability that values extracted by the information extractors are same but not the specific dynamic information desired to be extracted. As such, in this case, the value of $\alpha$ is set as 0.5. It should be understood that the $\alpha$ values exemplified above are given for illustration purpose only. Those skilled in the art should be able to set the value of $\alpha$ in accordance with the spirit of the disclosure.

The timeliness of an information extractor represents how timely the reference value extracted by the information extractor from the corresponding information source is updated. In other words, if the reference value extracted by the information extractor is updated faster, the information extractor has higher timeliness. In the exemplary embodiment of the disclosure, the timeliness is a value ranging from 0 to 1. For example, when the user uses the information extractor building unit 202 to initially build or rebuild an information extractor corresponding to a specific information source, the information extractor has timeliness set as 0.5. At each time point that the most reliable value is updated, the information extractor weight value updating unit 602 updates the timeliness according to the extraction history of the information extractor.

For example, when a reference value extracted by an information extractor at a previous time point is equal to a most reliable value of the present time point, the information extractor is determined as having a faster update rate, and the timeliness of the information extractor is updated according to equation (2). When a reference value extracted by an information extractor at a present time point is equal to a most reliable value of the previous time point, the information extractor is determined as having a slower update rate, and the timeliness of the information extractor is updated according to equation (3). When an information extractor is determined as neither having a faster update rate, nor having a slower update rate, the timeliness of the information extractor is updated according to equation (4).

$$T_{n,t}=T_{n,t-1}\times\beta+1.0\times(1-\beta) \quad (2);$$

$$T_{n,t}=T_{n,t-1}\times\beta+0.0\times(1-\beta) \quad (3);$$

$$T_{n,t}=T_{n,t-1}\times\beta+0.5\times(1-\beta) \quad (4);$$

wherein $T_{n,t}$ represents timeliness of the $n^{th}$ information extractor at the time point t, $T_{n,t-1}$ represents timeliness of the $n^{th}$ information extractor at the time point (t−1), and $\beta$ represents a timeliness adjusting factor. In the exemplary embodiment, the value of $\beta$ affects the range of the timeliness adjustment. A lower $\beta$ value indicates a larger range that the timeliness is adjusted, while a higher $\beta$ value indicates a smaller range that the timeliness is adjusted. The value of $\beta$ can be set by the user ranging from 0 to 1. In the exemplary embodiment of the disclosure, the $\beta$ value is set as 0.67.

For example, referring to FIG. 3, at the time point T2, the information extractor 102 is determined as an information extractor having a faster update rate, and thus the timeliness of the information extractor 102 is updated according to the equation (2). Similarly, at the time point T2, the information extractors 106, 108, and 110 are determined as information extractors having a slower update rate, and thus the timeliness of the information extractors 106, 108, and 110 are updated according to the equation (3). Likewise, at the time point T2, the information extractor 104 is determined as an information extractor neither having a faster update rate, nor having a slower update rate, and thus the timeliness of the information extractor 104 is updated according to the equation (4).

After determining the reliability and the timeliness of an information extractor, the weight value of the information extractor can then be determined by the information extraction and integration unit 206. In the exemplary embodiment of the disclosure, the weight value of each information extractor is determined according to equation (5):

$$W_{n,t}=R_{n,t}\times\gamma+T_{n,t}\times(1-\gamma) \quad (5),$$

wherein $W_{n,t}$ represents a weight value of the $n^{th}$ information extractor at the time point t and $\gamma$ represents a weight value adjusting factor. The value of $\gamma$ can be set by the user ranging from 0 to 1. In the current exemplary embodiment, the value of $\gamma$ is set as 0.75.

It should be understood that the foregoing discussion of calculating the reliability, the timeliness, and the weight value is given for illustrating the spirit of the disclosure without restricting the scope of the disclosure. Those skilled in the art may be taught in accordance with the spirit of the disclosure to allocate a suitable weight to each of the information extractors.

Figure 7:
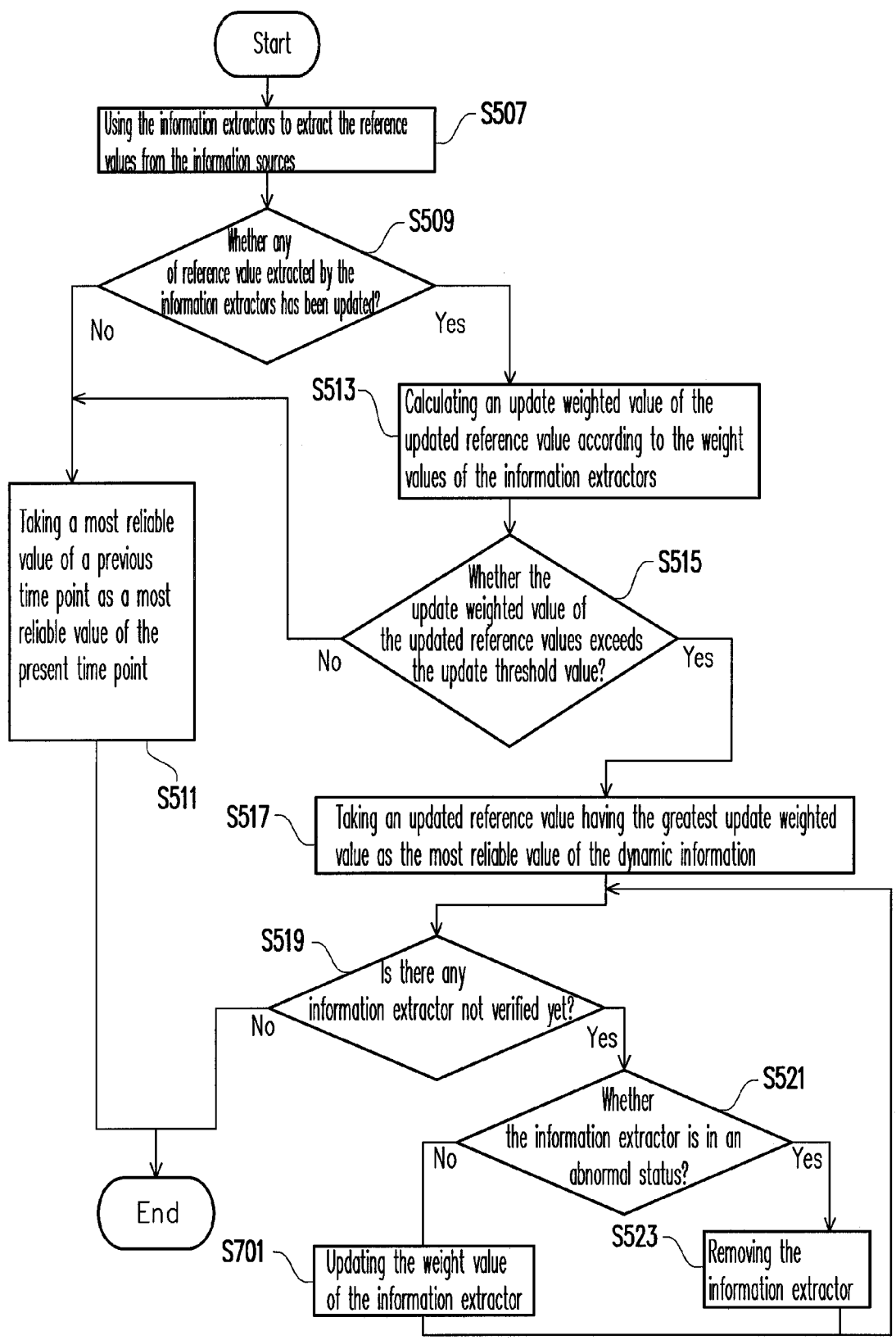
FIG. 7 illustrates a flow chart of the information extraction method according to the second exemplary embodiment of the disclosure.

FIG. 7 illustrates a flow chart of the information extraction method according to the second exemplary embodiment of the disclosure. Comparing with the flow chart shown in FIG. 5B, the flow chart of FIG. 7 further includes If at step S521 it is determined that the information extractor is not in an abnormal status, then at step S701, updating the weight value of the information extractor, and then the flow returning back to step S519.

Figure 8:
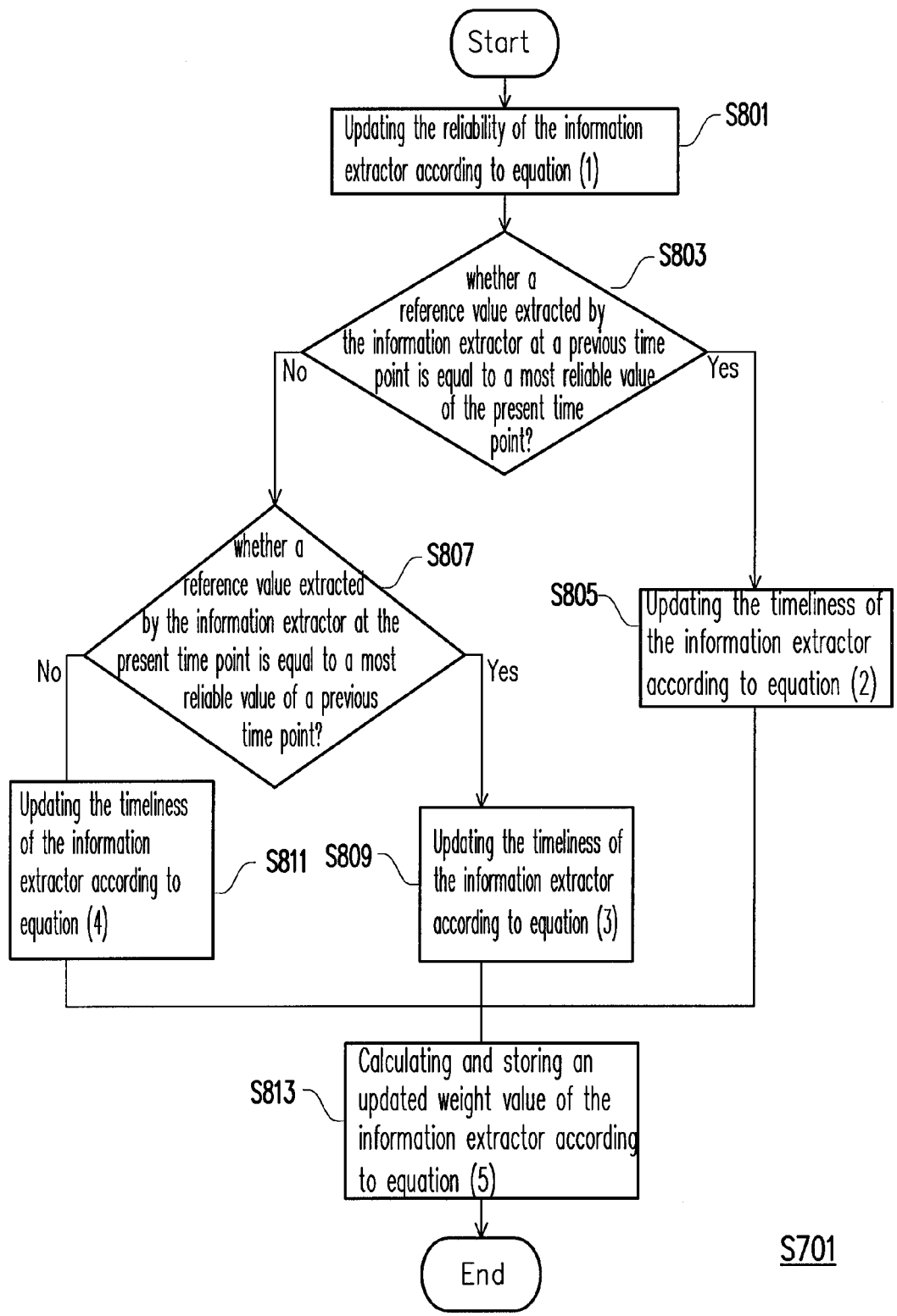
FIG. 8 is a flow chart illustrating details of the step S701 shown in FIG. 7.

FIG. 8 is a flow chart illustrating details of the step S701 shown in FIG. 7.

Referring to FIG. 8, at step S801, the reliability of the information extractor is updated according to equation (1). Then, at step S803, whether a reference value extracted by the information extractor at a previous time point is equal to a most reliable value of the present time point is determined. If it is determined that the reference value extracted by the information extractor at the previous time point is equal to the most reliable value of the present time point, then, at step S805, the timeliness of the information extractor is updated according to equation (2).

If it is determined that the reference value extracted by the information extractor at the previous time point is different from the most reliable value of the present time point, then, at step S807, whether a reference value extracted by the information extractor at the present time point is equal to a most reliable value of a previous time point is determined. If it is determined that the reference value extracted by the information extractor at the present time point is equal to the most reliable value of the previous time point, then at step S809, the timeliness of the information extractor is updated according to equation (3). If it is determined that the reference value extracted by the information extractor at the present time point is different from the most reliable value of the previous time point, then at step S811, the timeliness of the information extractor is updated according to equation (4).

Finally, at step S813, an updated weight value of the information extractor is calculated and stored according to equation (5) and in accordance with the updated reliability and timeliness of the information extractor.

In such a way, the information extraction system 600 can determines a most reliable value of a next time point according to the dynamic updated weight value and the reference valued extracted thereby of the information extractor at the next time point. Therefore, the most reliable value of the dynamic information can be more accurately and rapidly updated.

Third Exemplary Embodiment

In the second exemplary embodiment, when an information extractor is determined as in an abnormal status, the information extractor is going to be removed. However, after removing the abnormal information extractor, the information source originally connected to the removed information extractor does not have any information extractor connected thereto. In the exemplary embodiment of the disclosure, a new information extractor is rebuilt for the information source having no information extractor connected thereto.

FIG. 9 is a schematic block diagram illustrating an information extraction system 900 according to a third exemplary embodiment of the disclosure.

Referring to FIG. 9, comparing with the information extraction system 600, the information extraction system 900 further includes an information extractor rebuilding unit 902. The rest parts of the information extraction system 900 except the information extractor rebuilding unit 902 are structurally and functionally same with that of the information extraction system 600, and are not to be iterated hereby.

The information extractor rebuilding unit 902 is configured for building a substitutive information extractor for an information source which information extractor is determined as abnormal and then removed by the information extractor verification unit 208.

Specifically, after the information extractor corresponding to the information source is removed, the information extractor rebuilding unit 902 analyses a file of the information source and try to rebuild a substitutive information extractor for the information source.

For example, taking FIG. 4 as an example, at the time point T2, when the information extractor verification unit 208 verifies that the information extractor 102 is in an abnormal status, and removes the information extractor 102, the information extractor rebuilding unit 902 analyses the webpage 112 according to a file downloaded by the information extractor 102 from the webpage 112 at the time point T2 and analysed with a DOM tree, and builds substitutive information extractors corresponding to columns having reference values which are equal to the most reliable values of the time point T2 or the time point T1, respectively.

For example, it is assumed, at the time point T2, the webpage 112 has 3 columns having reference values of 11%. Because these 3 columns may be possibly the reference value corresponding to the raining probability of Taipei city, the information extractor rebuilding unit 902 rebuilds corresponding substitutive information extractors for all of these 3 columns, respectively. Then, reference values extracted by the substitutive information extractors corresponding to the 3 columns, and reference values extracted by original information extractors of the information extraction system 600 are together used for determining the most reliable value corresponding to the raining probability of Taipei city. The substitutive information extractors are then verified according to the first exemplary embodiment and the second exemplary embodiment of the disclosure, and the weight values thereof are updated thereby. The initial reliability and the initial timeliness of the substitutive information extractor can be set as 0 and 0.5, respectively. Specifically, when one information source is connected with a plurality of information extractors, in order to maintain the weights of the information sources balanced, the weight values of the information extractors can be averaged by the amount of the information extractors connected to the information source, as defined by equation (6) as following:

$$W_{n,t}=(R_{n,t}\times\gamma+T_{n,t}\times(1-\gamma))/N_{n,t} \quad (6),$$

wherein $N_{n,t}$ represents the amount of information extractors connected to the $n^{th}$ information source at the time point t.

FIG. 10 is an example for illustrating the information extraction according to the third exemplary embodiment of the disclosure.

Referring to FIG. 10, the extraction procedure shown in FIG. 10 is subsequent to that described in FIG. 4, and the identical parts are not to be illustrated hereby.

As discussed above, at the time point T2, the information extractor 102 is verified as in an abnormal status, and is then removed. After that, there is not any information extractor connected to the webpage 112. Then, the information extractor rebuilding unit 902 detects 3 possible columns according to the content of the webpage 112 and rebuilds substitutive information extractors 102-1, 102-2, and 102-3, respectively, as indicated at the time point T2'.

Then, at the time point T3, the reference values of the raining probability of Taipei city extracted by the information extractors 102-1, 102-2, 102-3, 104, 106, 108, and 110 from the webpages 112, 114, 116, 118, and 120 are 12%, 11%, 11%, 12%, 12%, 11%, and 11%, respectively. The information extraction and integration unit 206 determines that the most reliable value of the raining probability of Taipei city at the time point T3 is 12%. Then, at the time point T4, the reference values of the raining probability of Taipei city extracted by the information extractors 102-1, 102-2, 102-3, 104, 106, 108, and 110 from the webpages 112, 114, 116, 118, and 120 are 13%, 11%, 11%, 13%, 13%, 12%, and 12%, respectively. Therefore, the information extraction and integration unit 206 determines that the most reliable value of the raining probability of Taipei city at the time point T4 is 13%. In this case, the reference values extracted by the information extractors 102-2 and 102-3 at the time point T3 are "11%" which is different from the most reliable value "12%" at the time point T3, and is also different from the most reliable value "13%" at the time point T4. Further, the reference value extracted by the information extractors 102-2 and 102-3 at the time point T4 is "11%" which is different from the most reliable value "12%" at the time point T3, and is also different from the most reliable value "13%" at the time point T4. As such, the information extraction and integration unit 206 determines that the information extractors 102-2 and 102-3 are in abnormal status and removes them away.

According to the exemplary embodiment of the disclosure, substitutive information extractors can be effectively rebuilt for those information sources having no information extractors connected thereto. In this manner, the information extraction system according to the exemplary embodiment of the disclosure can perform self-recovery.

Figure 11:
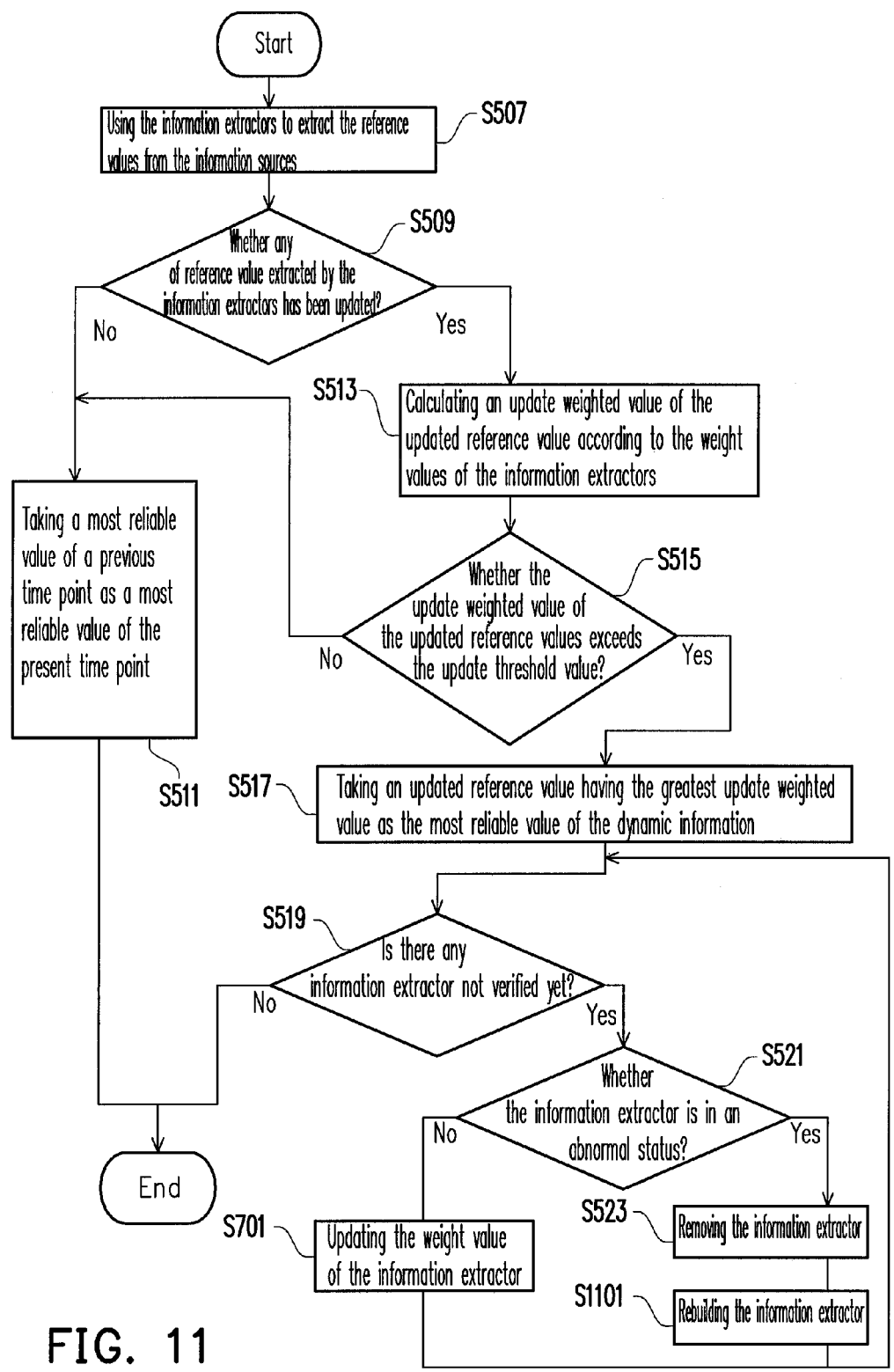
FIG. 11 illustrates a flow chart of the information extraction method according to the third exemplary embodiment of the disclosure.

FIG. 11 illustrates a flow chart of the information extraction method according to the third exemplary embodiment of the disclosure.

Referring to FIG. 11, comparing with the flow chart shown in FIG. 7, the flow chart illustrated by FIG. 11 further includes rebuilding the information extractor (step S1101) after step S523, and then returning back to step S519.

Figure 12:
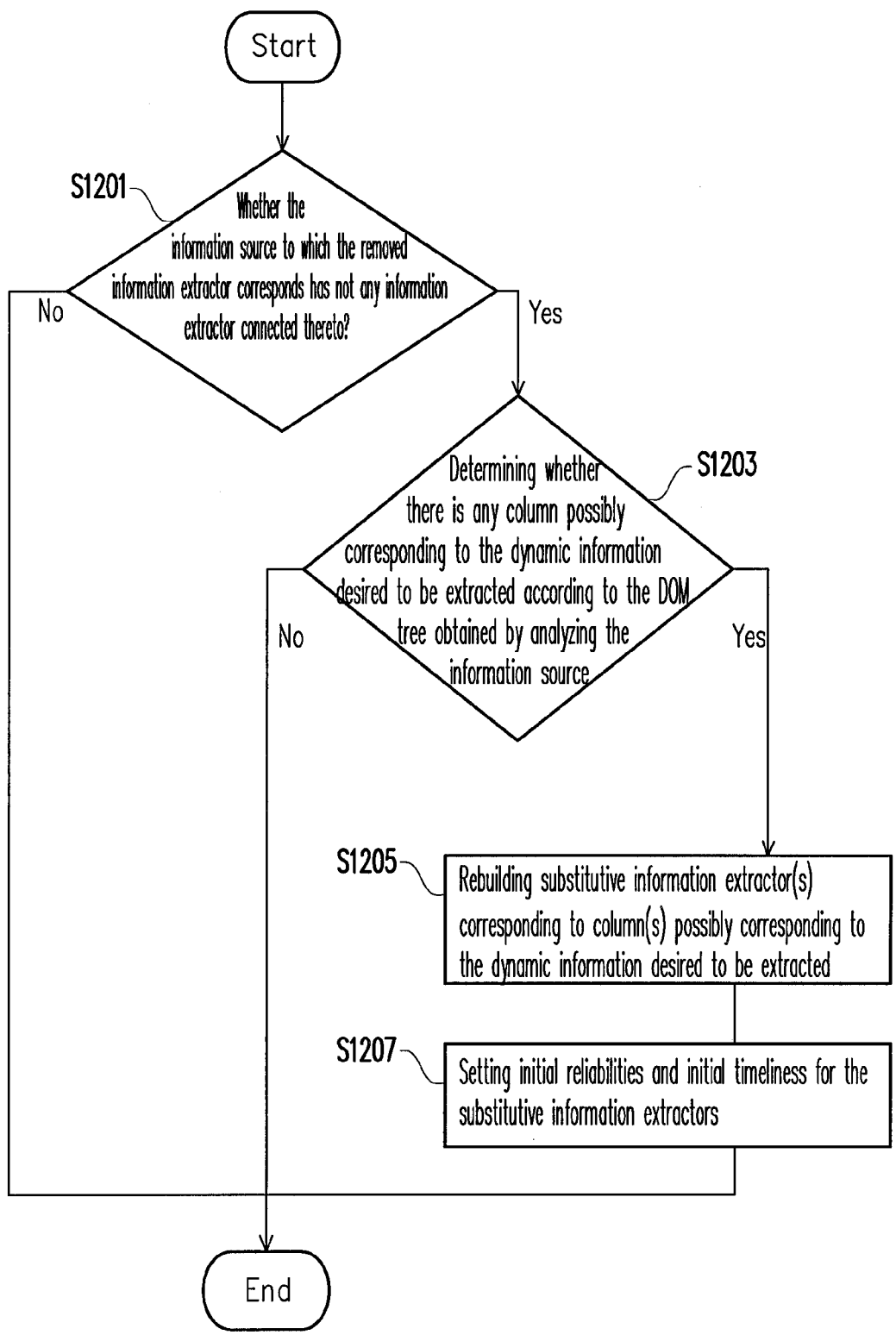
FIG. 12 is a flow chart illustrating details of the step S1101 shown in FIG. 11.

FIG. 12 is a flow chart illustrating details of the step S1101 shown in FIG. 11.

Referring to FIG. 12, at step S1201, whether the information source to which the removed information extractor corresponds has not any information extractor connected thereto is determined. If it is determined that there is no information extractor connected to the information source, then at step S1203, whether there is any column possibly corresponding to the dynamic information desired to be extracted is determined according to the DOM tree obtained by analysing the information source. If it is determined that there is/are such column(s) at step S1203, then at step S1205, substitutive information extractor(s) is/are rebuilt corresponding to the column(s) possibly corresponding to the dynamic information desired to be extracted. Then, at step S1207, initial reliability and initial timeliness are set for the substitutive information extractors.

Fourth Exemplary Embodiment

Figures 13, 14:
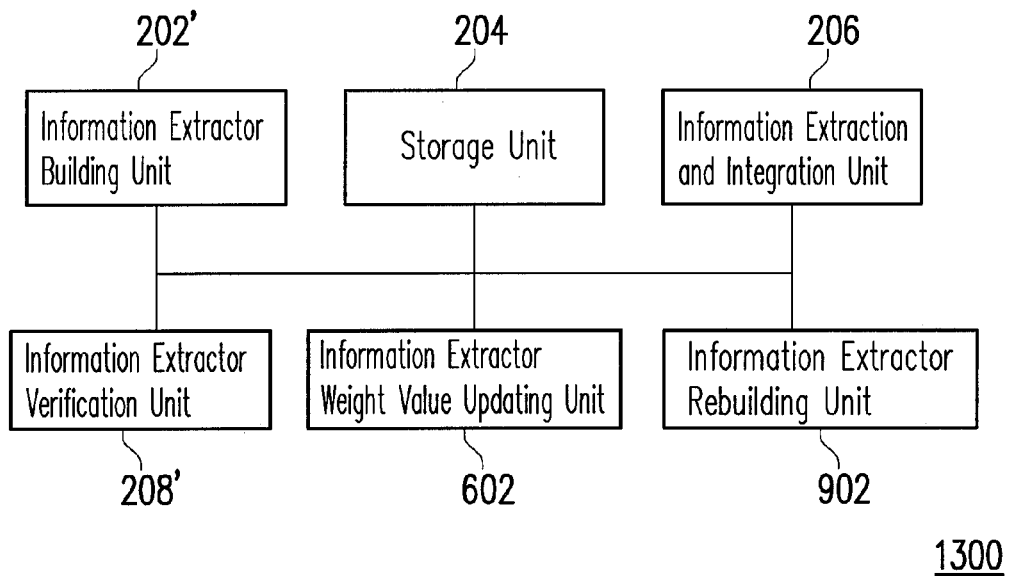
FIG. 13 is a schematic block diagram illustrating an information extraction system according to a fourth exemplary embodiment of the disclosure.
FIG. 14 shows an example for illustrating the determination of an abnormal information extractor according to the fourth exemplary embodiment of the disclosure.

FIG. 13 is a schematic block diagram illustrating an information extraction system according to a fourth exemplary embodiment of the disclosure.

Referring to FIG. 13, the information extraction system 1300 includes an information extractor building unit 202', the storage unit 204, the information extraction and integration unit 206, an information extractor verification unit 208', the information extractor weight value updating unit 602 and information extractor rebuilding unit 902.

In the information extraction system 900 shown in the third exemplary embodiment, the information extractor verification unit 208 verifies whether the information extractor is in an abnormal status according to the reference values presently and previously extracted by the information extractor and the most reliable values determined presently and previously (as shown in FIG. 4). However, in the information extraction system 1300 shown in the fourth exemplary embodiment, the information extractor building unit 202' sets abnormal counting values for the information extractors, respectively, and the information extractor verification unit 208' verifies whether the information extractor is in an abnormal status according to the reference values presently extracted by the information extractor and the most reliable values determined presently and the abnormal counting value of the information extractor. Besides the difference described above, the structures and the functions of the information extractor building unit 202' and the information extractor verification unit 208' are the same as the structures and the functions of the information extractor building unit 202 and the information extractor verification unit 208. The difference between the fourth exemplary embodiment and the third exemplary embodiment is explained in detail as follows.

Besides the weight values, the information extractor building unit 202' further sets abnormal counting values for the information extractors, respectively, and the information extractor verification unit 208' verifies whether the information extractor is in an abnormal status (i.e. whether the information extractor is an abnormal information extractor) by comparing the abnormal counting value of the information extractor to an abnormal counting threshold value. The abnormal counting threshold value represents the maximum number of times, permitted by the information extraction system 1300, that the information extractor does not extract right information. The operation of the information extractor verification unit 208' will be described in detail by an example as follows.

FIG. 14 shows an example for illustrating the determination of an abnormal information extractor according to the fourth exemplary embodiment of the disclosure. In the example, the abnormal counting threshold value is set as "2", and values recorded in brackets represent the abnormal counting values of the information extracts at each time point.

Referring to FIG. 14, at the time point T0, all reference values of the raining probability of Taipei city extracted by the information extractors 102, 104, 106, 108, and 110 from the webpages 112, 114, 116, 118, and 120 are 10%, the maximum reliable of the raining probability of Taipei city at the time point T0 is 10%, and the abnormal counting values of the information extractors 102, 104, 106, 108, and 110 are 0.

At the time point T1, the reference values of the raining probability of Taipei city extracted by the information extractors 102, 104, 106, 108, and 110 from the webpages 112, 114, 116, 118, and 120 are 90%, 10%, 10%, 10%, and 10%, respectively. And, the information extraction and integration unit 206 determines that the most reliable value of the raining probability of Taipei city at the time point T1 is 10%. At this time, the information extractor verification unit 208' determines that the most reliable value is not changed (i.e. the most reliable value at the time point T1 is equal to the most reliable value at the time point T0), so the information extractor verification unit 208' may reset the abnormal counting values of the information extractors. To be specific, when the reference value presently extracted by the information extractor is equal to the most reliable value determined presently, the information extractor verification unit 208' resets the abnormal counting value of the information extractor (e.g. the abnormal counting value of the information extractor is set as 0). At the time point T1, the information extractor verification unit 208' does not reset the abnormal counting value of the information extractor 102 because the reference value extracted by the information extractor 102 is not equal to the most reliable value; and the information extractor verification unit 208' resets the abnormal counting values of the information extractor 104, 106, 108, and 110 because the reference values extracted by the information extractor 104, 106, 108 and 110 are equal to the most reliable value.

At the time point T2, the reference values of the raining probability of Taipei city extracted by the information extractors 102, 104, 106, 108, and 110 from the webpages 112, 114, 116, 118, and 120 are 90%, 11%, 11%, 10%, and 10%, respectively. And, the information extraction and integration unit 206 determines that the most reliable value of the raining probability of Taipei city at the time point T2 is 11%. At this time, the information extractor verification unit 208' determines that the most reliable value is changed (i.e. the most reliable value at the time point T2 is equal to the most reliable value at the time point T1), so the information extractor verification unit 208' may reset and count the abnormal counting values of the information extractors. To be specific, the information extractor verification unit 208' compares the reference values presently extracted by the information extractors with the most reliable value one by one. And, when the reference value presently extracted by the information extractor is not equal to the most reliable value determined presently, the information extractor verification unit 208' counts the abnormal counting value of the information extractor (e.g. the abnormal counting value of the information extractor is added by 1), and when the reference value presently extracted by the information extractor is equal to the most reliable value determined presently, the information extractor verification unit 208' resets the abnormal counting value of the information extractor. Additionally, the information extractor verification unit 208' determines whether the changed abnormal counting value is smaller than the abnormal counting threshold value. When the abnormal counting value of the information extractor is not smaller than the abnormal counting threshold value, the information extractor verification unit 208' verifies that the information extractor is in an abnormal status.

At the time point T2, the information extractor verification unit 208' changes the abnormal counting values of the information extractors 102, 108 and 110 from "0" to "1" because the reference values extracted by the information extractor 102, 108 and 110 are not equal to the most reliable value; and the information extractor verification unit 208' keeps the abnormal counting values of the information extractor 104 and 106 as "0" because the reference values extracted by the information extractor 104 and 106 are equal to the most reliable value. Additionally, because all the abnormal counting values of the information extractors are smaller than the abnormal counting threshold value, no information extractor is verified as abnormal.

At the time point T3, the reference values of the raining probability of Taipei city extracted by the information extractors 102, 104, 106, 108, and 110 from the webpages 112, 114, 116, 118, and 120 are 91%, 12%, 11%, 11%, and 11%, respectively. And, the information extraction and integration unit 206 determines that the most reliable value of the raining probability of Taipei city at the time point T3 is 11%. At this time, the information extractor verification unit 208' determines that the most reliable value is not changed (i.e. the most reliable value at the time point T3 is equal to the most reliable value at the time point T2), so the information extractor verification unit 208' may reset the abnormal counting values of the information extractors.

At the time point T3, the information extractor verification unit 208' does not reset the abnormal counting values of the information extractors 102 and 104 because the reference values extracted by the information extractor 102 and 104 are not equal to the most reliable value; and the information extractor verification unit 208' resets the abnormal counting values of the information extractor 106, 108 and 110 because the reference values extracted by the information extractor 106, 108 and 110 are equal to the most reliable value.

At the time point T4, the reference values of the raining probability of Taipei city extracted by the information extractors 102, 104, 106, 108, and 110 from the webpages 112, 114, 116, 118, and 120 are 91%, 12%, 12%, 11%, and 11%, respectively. And, the information extraction and integration unit 206 determines that the most reliable value of the raining probability of Taipei city at the time point T4 is 12%. At this time, the information extractor verification unit 208' determines that the most reliable value is changed (i.e. the most reliable value at the time point T4 is equal to the most reliable value at the time point T3), so the information extractor verification unit 208' may reset and count the abnormal counting values of the information extractors and verify whether the information extractors are abnormal.

At the time point T4, the information extractor verification unit 208' resets the abnormal counting values of the information extractors 104 and 106 because the reference values extracted by the information extractor 104 and 106 are equal to the most reliable value. And, the information extractor verification unit 208' counts the abnormal counting values of the information extractor 102, 108 and 110 (i.e. the abnormal counting value of the information extractors 102 is changed from "1" to "2"; the abnormal counting value of the information extractors 108 is changed from "0" to "1"; and the abnormal counting value of the information extractors 110 is changed from "0" to "1") because the reference values extracted by the information extractor 102, 108 and 110 are not equal to the most reliable value. Additionally, because the abnormal counting values of the information extractor 102 is not smaller than the abnormal counting threshold value, the information extractor verification unit 208' verifies the information extractor 102 is in an abnormal status.

As the example shown in FIG. 14, in the exemplary embodiment, the information extractor verification unit 208' verifies whether the information extractors are abnormal by resetting and counting the abnormal counting values.

Figure 15A:
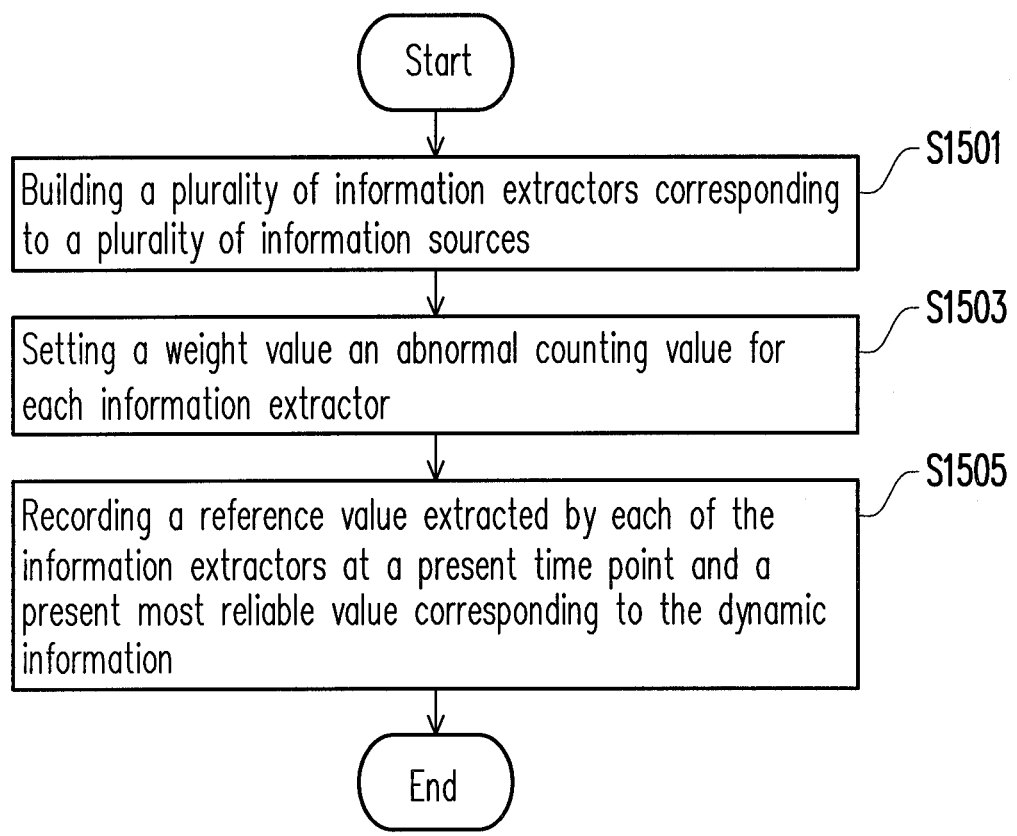
FIG. 15A and FIG. 15B illustrate flow charts of the information extraction method according to the fourth exemplary embodiment of the disclosure.
Figure 15B:
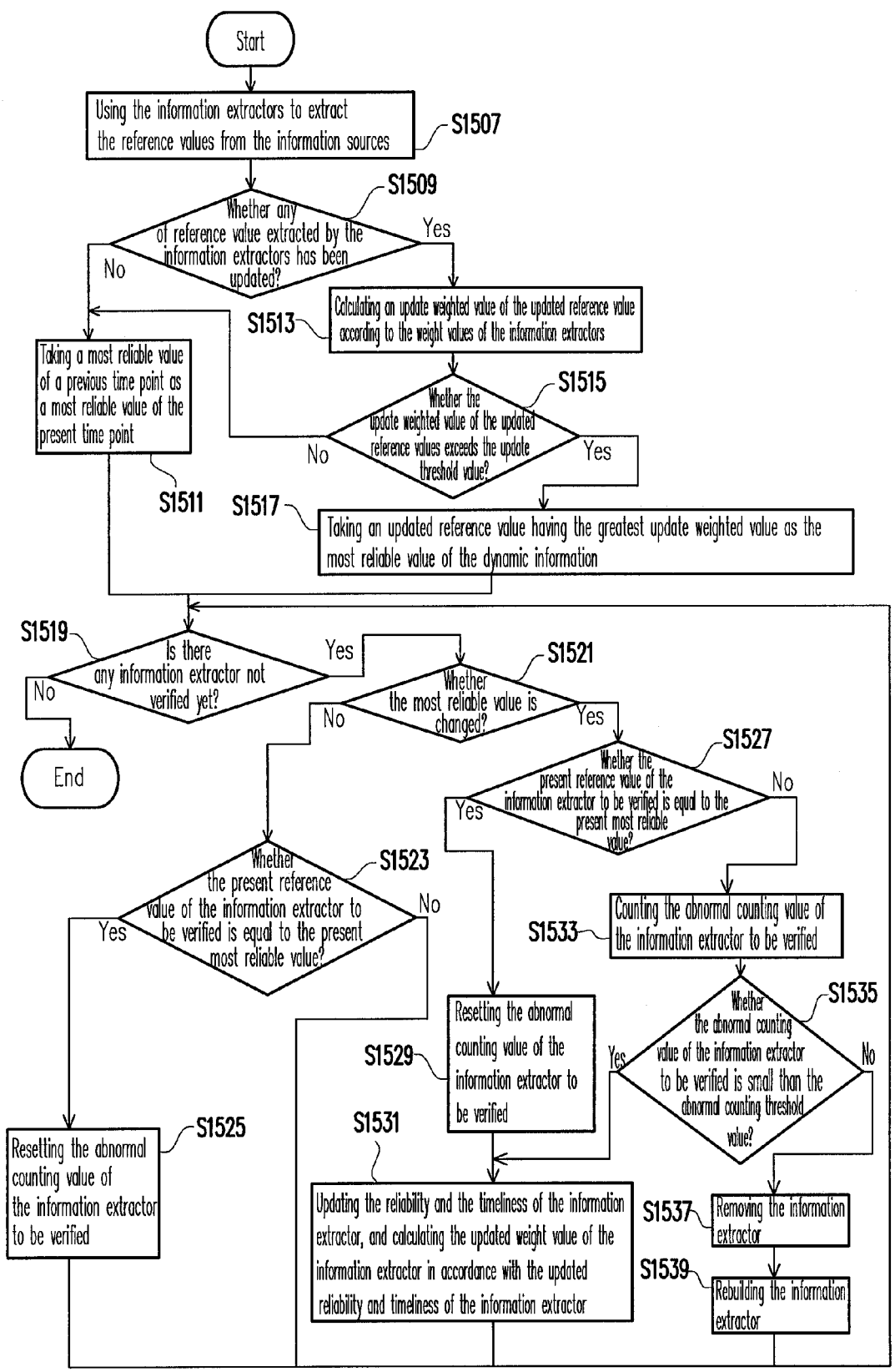

FIG. 15A and FIG. 15B illustrate flow charts of the information extraction method according to the fourth exemplary embodiment of the disclosure, wherein steps for building the information extractors are shown in FIG. 15A and steps for extracting information are shown in FIG. 15B.

Referring to FIG. 15A, at step S1501, a plurality of information extractors (e.g. the information extractors 102, 104, 106, 108, and 110) are built corresponding to a plurality of information sources (e.g. the webpages 112, 114, 116, 118, and 120). For example, the built information extractors are used for extracting the dynamic information (e.g. the raining probability of Taipei city) from the information sources, respectively. Then, at step S1503, weight values and abnormal counting values are set for the information extractors, respectively. Then, at step S1505, a reference value extracted by each of the information extractors at a present time point and a present most reliable value corresponding to the dynamic information are recorded. Hereby, after performing the steps S1501 through S1505, the initialization of the information extractors is completed.

Then, referring to FIG. 15B, at step S1507, reference values are extracted by the information extractors from the information sources.

Then, at step S1509, it is determined whether there is a reference value extracted by any information extractor has been updated. If it is determined that none of the reference values extracted by the information extractor has been updated, then at step S1511, a most reliable value of a previous time point is taken serving as a most reliable value of a present time point. If otherwise, at step S1509, it is determined that whether there is any reference value extracted by an information extractor having been updated, then at step S1513, an update weighted value of the updated reference value is calculated according to the weight values of the information extractors. Specifically, at step S1513, only the update weighted value of the updated reference value at the present point is calculated, while the reference values of those non-updated reference values are not counted in the calculation.

Then, at step S1515, it is determined whether the update weighted value of the updated reference values exceeds the update threshold value. If it is determined that the update weighted value of the updated reference values does not exceed the update threshold value, step S1511 is executed.

If it is determined that the update weighted value of the updated reference values exceeds the update threshold value, then at step S1517, an updated reference value having the greatest update weighted value is taken serving as the most reliable value of the dynamic information. When the most reliable value corresponding to the dynamic information has been updated, in the information extraction method of the exemplary embodiment, the abnormal counting value of each of the information extractors is reset or counted and the information extractors are verified according to the updated abnormal counting values.

At step S1519, it is determined whether there is any information extractor not verified yet. If all of the information extractors have been verified, then the flow shown in FIG. 15B is ended. If it is determined that there is an information extractor not verified, then at step S1521, it is determined whether the most reliable value is changed (i.e. whether the present most reliable value is not equal to the previous most reliable value).

If at step S1521 it is determined that the most reliable value is not changed, then at step S1523, it is determined whether the present reference value of the information extractor to be verified is equal to the present most reliable value. If the present reference value of the information extractor to be verified is equal to the present most reliable value, then at step S1525, the abnormal counting value of the information extractor to be verified is reset (i.e. the abnormal counting value of the information extractor is set as "0").

If at step S1521 it is determined that the most reliable value is changed, then at step S1527, it is determined whether the present reference value of the information extractor to be verified is equal to the present most reliable value. If the present reference value of the information extractor to be verified is equal to the present most reliable value, then at step S1529, the abnormal counting value of the information extractor to be verified is reset.

Then, at step S1531, the weight value of the information extractor is updated. To be specific, at step S1531, the reliability and the timeliness of the information extractor are updated, and an updated weight value of the information extractor is calculated in accordance with the updated reliability and timeliness of the information extractor. Here, step S1531 is the same as step S701 (as shown in FIG. 8), therefore, the details of step S1531 are not explained repeatedly.

If at step S1527 it is determined that the present reference value of the information extractor to be verified is not equal to the present most reliable value, then at step S1533, the abnormal counting value of the information extractor to be verified is counted (e.g. the abnormal counting value of the information extractor is added by "1"), and at step S1535, it is determined whether the abnormal counting value of the information extractor to be verified is small than the abnormal counting threshold value.

If at step S1535 it is determined that the abnormal counting value of the information extractor to be verified is smaller than the abnormal counting threshold value, then step S1531 is executed. If it is determined that the abnormal counting value of the information extractor to be verified is not smaller than the abnormal counting threshold value, then at step S1537, the information extractor to be verified is removed (i.e. the information extractor is verified as the abnormal information extractor). After that, at step S1539, the information extractor is re-built, and the flow returns back to step S1519. Here, step S1537 and S1539 are the same as step S532 and S1101, respectively, and therefore the details of step S1537 and step S1539 are not explained repeatedly.

It should be noted that, the information extraction methods illustrated in the first, the second, the third exemplary embodiments, and the fourth exemplary embodiments, respectively are exemplified as correspondingly executed by the information extraction systems illustrated in FIGS. 2, 6, 9, and 13, respectively. However, the disclosure is not restricted as such. The foregoing information extraction methods can also be implemented as a software program stored in a storage medium. When a user terminal having a processor unit executes the software program, the user terminal can then executes the foregoing steps of information extraction. Further, it should also be notified that the flows illustrated in FIGS. 5, 7, 8, 11, 12, 15A and 15B are examples only and are not exemplified for restricting the sequence of the steps thereof.

In summary, in the disclosure a plurality of information extractors for is configured for extracting reference values corresponding to dynamic information from a plurality of information sources, and a most reliable value of the corresponding dynamic information is determined according to a weight value and an updating threshold value of each of the information extractors. Therefore, in the disclosure, abnormal information extractors can be detected according to the determining result, and information extractors is rebuilt for the information sources previously connected with the abnormal information extractors. In such a way, the information extraction system according to the disclosure dynamically adjusts the weight value of each of the information extractors according to the extraction history of the information extractor. Therefore, the most reliable value of the dynamic information extracted by the information extraction system according to the disclosure can be more accurately and rapidly updated. Further, the disclosure provides an information extractor rebuilding mechanism. Therefore, the information extraction system has the self-recovery function, thus avoiding failure of extracting information due to redesign of the information source.

It will be apparent to those skilled in the art that various modifications and variations can be made to the structure of the disclosure without departing from the scope or spirit of the disclosure. In view of the foregoing, it is intended that the disclosure cover modifications and variations of this invention provided they fall within the scope of the following claims and their equivalents.

What is claimed is:

1. An information extraction method, for extracting dynamic information, the information extraction method comprising:
   building a plurality of information extractors for connecting with a plurality of information sources, wherein each of the information sources provides the dynamic information;
   setting a weight value for each of the information extractors;
   recording a first reference value of the dynamic information extracted by each of the information extractors from each of the corresponding information sources at a first time point, and determining a first reliable value corresponding to the dynamic information according to the first reference values;
   using each of the information extractors to extract a second reference value of the dynamic information from each of the corresponding information sources at a second time point;
   determining a second reliable value corresponding to the dynamic information at the second time point according to the weight values and the second reference values; and
   verifying whether the information extractors are abnormal, and when one of the information extractors is verified as an abnormal information extractor, removing the verified abnormal information extractor.

2. The information extraction method according to claim 1 further comprising calculating the weight value of each of the information extractors according to reliability and timeliness of each of the information extractor.

3. The information extraction method according to claim 2 further comprising dynamically updating the reliability, the timeliness and the weight value of each of the information extractors.

4. The information extraction method according to claim 1 further comprising building at least one substitutive information extractor for each information source having no information extractor connected thereto, after removing the verified abnormal information extractor.

5. The information extraction method according to claim 4, further comprising:
   using each of the information extractors and the at least one substitutive information extractor to extract a third reference value of the dynamic information from each of the corresponding information sources at a third time point;
   determining a third reliable value corresponding to the dynamic information at the third time point according to the third reference values;
   verifying whether the information extractors and the at least one substitutive information extractor are abnormal according to the second reference values and the third reference values, and the second reliable value and the third second reliable value, respectively; and
   when one of the information extractors and the at least one substitutive information extractor is verified as the abnormal information extractor, removing the verified abnormal information extractor.

6. The information extraction method according to claim 1, wherein the step of building the information extractors for connecting with the information sources comprises analysing the information sources connected to the information extractors with a document object model (DOM) tree, a finite state machine or a regular expression.

7. The information extraction method according to claim 1, wherein the step of verifying whether the information extractors are abnormal includes:
   verifying whether the information extractors are abnormal according to the first reference values and the second reference values, and the first reliable value and the second reliable value, respectively.

8. The information extraction method according to claim 1, wherein the step of verifying whether the information extractors are abnormal includes:
   setting abnormal counting values for the information extractors, respectively;
   determining whether the second reference values are not equal to the second reliable value, respectively, and when the second reference value of the information extractor is not equal to the second reliable value, counting the abnormal counting value of the information extractor; and
   determining whether the abnormal counting values are smaller than an abnormal counting threshold value, respectively, and when the abnormal counting value of the information extractor is not smaller than the abnormal counting threshold value, verifying the information extractor is the abnormal information extractor.

9. The information extraction method according to claim 8, wherein the steps of determining whether the second reference values are not equal to the second reliable value, respectively, and when the second reference value of the information extractor is not equal to the second reliable value, counting the abnormal counting value of the information extractor are executed when the first reliable value is not equal to the second reliable value.

10. A non-transitory computer readable medium having a computer program product comprising an information extraction program, which when executed by a computer perform the information extraction method according to claim 1.

11. An information extraction system, for extracting dynamic information, the information extraction system comprising:
   a processor;
   an information extractor building unit, for building a plurality of information extractors for connecting with a plurality of information sources and setting a weight value of each of the information extractors, wherein each of the information source provides the dynamic information;
   a storage unit, for storing a first reference value of the dynamic information extracted by each of the information extractors from each of the corresponding information sources at a first time point, and a first reliable value corresponding to the dynamic information;
   an information extraction and integration unit, for using each of the information extractors to extract a second reference value of the dynamic information from each of the corresponding information sources at a second time point, and determining a second reliable value corresponding to the dynamic information at the second time point according to the weight values of the information extractors and the second reference values; and an information extractor verification unit, for verifying whether the information extractors are abnormal, respectively, wherein when one of the information extractors is verified as an abnormal information extractor, the information extractor verification unit removes the verified abnormal information extractor.

12. The information extraction system according to claim 11, wherein the weight value of each of the information extractors is calculated according to reliability and timeliness of each of the information extractor.

13. The information extraction system according to claim 12 further comprising an information extractor weight value updating unit, for dynamically updating the reliability, the timeliness, and the weight value of each of the information extractors.

14. The information extraction system according to claim 11 further comprising an information extractor rebuilding unit, for building at least one substitutive information extractor for each information source having no information extractor connected thereto, after the information extractor verification unit removes the verified abnormal information extractor.

15. The information extraction system according to claim 14, wherein the information extraction and integration unit is further for using each of the information extractors and the at least one substitutive information extractor to extract a third reference value of the dynamic information from each of the corresponding information sources at a third time point, and determining a third reliable value corresponding to the dynamic information at the third time point according to the third reference values.

16. The information extraction system according to claim 15, wherein the information extractor verification unit is further for verifying whether the information extractors and the at least one substitutive information extractor are abnormal according to the second reference values and the third reference values, and the second reliable value and the third reliable value, respectively, wherein when one of the information extractors and the at least one substitutive information extractor is verified as the abnormal information extractor, the information extractor verification unit removes the verified abnormal information extractor.

17. The information extraction system according to claim 11, wherein the information extractors analyse the information sources connected thereto with a document object model (DOM) tree, a finite state machine or a regular expression.

18. The information extraction system according to claim 11, wherein the information extractor verification unit verifies whether the information extractors are abnormal according to the first reference values and the second reference values, and the first reliable value and the second reliable value, respectively.

19. The information extraction system according to claim 11, wherein the information extractor verification unit sets abnormal counting values for the information extractors, respectively, wherein the information extractor verification unit determines whether the second reference values are not equal to the second reliable value, respectively, and when the second reference value of the information extractor is not equal to the second reliable value, counts the abnormal counting value of the information extractor, wherein the information extractor verification unit determines whether the abnormal counting values are smaller than an abnormal counting threshold value, respectively, and when the abnormal counting value of the information extractor is not smaller than the abnormal counting threshold value, verifies the information extractor is the abnormal information extractor.

20. The information extraction system according to claim 19, wherein when the first reliable value is not equal to the second reliable value, the information extractor verification unit determines whether the second reference values are not equal to the second reliable value, respectively, and when the second reference value of the information extractor is not equal to the second reliable value, counts the abnormal counting value of the information extractor.

21. An information extractor rebuilding method, for an information extraction system, wherein the information extraction system is for extracting dynamic information from a plurality of information sources connected with a plurality of information extractors, and each of the information extractors has a weight value, the information rebuilding method comprising:

using each of the information extractors to extract a second reference value of the dynamic information from each of the corresponding information sources at a second time point;

determining a second reliable value corresponding to the dynamic information at the second time point according to the weight values and the second reference values;

building at least one substitutive information extractor for each information source having no information extractor connected thereto according to the second reliable value;

using each of the information extractors and the at least one substitutive information extractor to extract a third reference value of the dynamic information from each of the corresponding information sources at a third time point;

determining a third reliable value corresponding to the dynamic information at the third time point according to the weight values and the third reference values; and verifying whether the information extractors and the at least one substitutive information extractor are abnormal, and when one of the information extractors and the at least one substitutive information extractor is verified as an abnormal information extractor, removing the verified abnormal information extractor.

22. The information extractor rebuilding method according to claim 21 further comprising calculating the weight value of each of the information extractors according to reliability and timeliness of each of the information extractor.

23. The information extractor rebuilding method according to claim 22 further comprising dynamically updating the reliability, the timeliness and the weight value of each of the information extractors.

24. The information extractor rebuilding method according to claim 21, wherein the step of building the at least one substitutive information extractor comprises analysing the information sources connected thereto with a document object model (DOM) tree, a finite state machine or a regular expression.

25. The information extractor rebuilding method according to claim 21, wherein the step of verifying whether the information extractors and the at least one substitutive information extractor are abnormal includes:

verifying whether the information extractors and the at least one substitutive information extractor are abnormal according to the second reference values and the third reference values, and the second reliable value and the third second reliable value.

26. The information extractor rebuilding method according to claim 21, wherein the step of verifying whether the information extractors and the at least one substitutive information extractor are abnormal includes:
setting abnormal counting values for the information extractors and the at least one substitutive information extractor, respectively;
determining whether the third reference values are not equal to the third reliable value, respectively, and when the third reference value of the information extractor or the at least one substitutive information extractor is not equal to the second reliable value, counting the abnormal counting value of the information extractor or the at least one substitutive information extractor; and
determining whether the abnormal counting values are smaller than an abnormal counting threshold value, respectively, and when the abnormal counting value of the information extractor or the at least one substitutive information extractor is not smaller than the abnormal counting threshold value, verifying the information extractor or the at least one substitutive information extractor is the abnormal information extractor.

27. The information extractor rebuilding method according to claim 26, wherein the steps of determining whether the third reference values are not equal to the third reliable value, respectively, and when the third reference value of the information extractor or the at least one substitutive information extractor is not equal to the second reliable value, counting the abnormal counting value of the information extractor or the at least one substitutive information extractor are executed when the second reliable value is not equal to the third reliable value.

28. A non-transitory computer readable medium having a computer program product comprising an information extractor rebuilding program, which when executed by a computer perform the information extractor rebuilding method according to claim 21.

29. An information extractor rebuilding system, for an information extraction system, wherein the information extraction system is for extracting dynamic information from a plurality of information sources connected with a plurality of information extractors, and each of the information extractors has a weight value, the information extractor rebuilding system comprises:
a processor;
an information extraction and integration unit, for using each of the information extractors to extract a second reference value of the dynamic information from each of the corresponding information sources at a second time point, and determining a second reliable value corresponding to the dynamic information at the second time point according to the weight values and the second reference values;
an information extractor rebuilding unit, for building at least one substitutive information extractor for each information source having no information extractor connected thereto according to the second reliable value, wherein the information extraction and integration unit is further for using each of the information extractors and the at least one substitutive information extractor to extract a third reference value of the dynamic information from each of the corresponding information sources at a third time point, and determining a third reliable value corresponding to the dynamic information at the third time point according to the weight values and the third reference values; and
an information extractor verification unit, for verifying whether the information extractors and the at least one substitutive information extractor are abnormal, respectively,
wherein when one of the information extractors and the at least one substitutive information extractor is verified as an abnormal information extractor, the information extractor verification unit removes the verified abnormal information extractor.

30. The information extractor rebuilding system according to claim 29, wherein the weight value of each of the information extractors is calculated according to reliability and timeliness of each of the information extractor.

31. The information extractor rebuilding system according to claim 30 further comprising an information extractor weight value updating unit, for dynamically updating the reliability, the timeliness, and the weight value of each of the information extractors.

32. The information extractor rebuilding system according to claim 29, wherein the at least one substitutive information extractor analyses the information sources connected thereto with a document object model (DOM) tree, a finite state machine or a regular expression.

33. The information extractor rebuilding system according to claim 29, wherein the information extractor verification unit verifies whether the information extractors and the at least one substitutive information extractor are abnormal according to the second reference values and the third reference values, and the second reliable value and the third second reliable value.

34. The information extractor rebuilding system according to claim 29, wherein the information extractor verification unit sets abnormal counting values for the information extractors and the at least one substitutive information extractor, respectively,
wherein the information extractor verification unit determines whether the third reference values are not equal to the third reliable value, respectively, and when the third reference value of the information extractor or the at least one substitutive information extractor is not equal to the second reliable value, counts the abnormal counting value of the information extractor or the at least one substitutive information extractor,
wherein the information extractor verification unit determines whether the abnormal counting values are smaller than an abnormal counting threshold value, respectively, and when the abnormal counting value of the information extractor or the at least one substitutive information extractor is not smaller than the abnormal counting threshold value, verifies the information extractor or the at least one substitutive information extractor is the abnormal information extractor.

35. The information extractor rebuilding system according to claim 34, wherein when the second reliable value is not equal to the third reliable value, the information extractor verification unit determines whether the third reference values are not equal to the third reliable value, respectively, and when the third reference value of the information extractor or the at least one substitutive information extractor is not equal to the second reliable value, counts the abnormal counting value of the information extractor or the at least one substitutive information extractor.

* * * * *